(12) United States Patent
Yakita

(10) Patent No.: US 7,064,903 B2
(45) Date of Patent: Jun. 20, 2006

(54) LENS DEVICE AND SHOOTING SYSTEM

(75) Inventor: Shinichiro Yakita, Utsunomiya (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 11/092,954

(22) Filed: Mar. 29, 2005

(65) Prior Publication Data

US 2005/0219712 A1    Oct. 6, 2005

(30) Foreign Application Priority Data

Apr. 1, 2004    (JP)    ............... 2004-109412

(51) Int. Cl.
*G02B 15/14*    (2006.01)
(52) U.S. Cl. ..................... 359/690; 359/684
(58) Field of Classification Search ........ 359/680–682, 359/684, 689, 690
See application file for complete search history.

(56) References Cited

U.S. PATENT DOCUMENTS

| | | |
|---|---|---|
| 4,812,024 A | 3/1989 | Mukaiya |
| 4,934,796 A | 6/1990 | Sugiura |
| 5,050,972 A | 9/1991 | Mukaiya |
| 5,056,900 A | 10/1991 | Mukaiya |
| 5,847,882 A | 12/1998 | Nakayama |
| 5,898,525 A | 4/1999 | Suzuki |
| 6,094,312 A | 7/2000 | Nakayama |
| 6,606,194 B1 * | 8/2003 | Hamano et al. ............ 359/557 |
| 2001/0019455 A1 | 9/2001 | Miyano |

FOREIGN PATENT DOCUMENTS

| | | |
|---|---|---|
| JP | 1-284818 A | 11/1989 |
| JP | 2-118510 A | 5/1990 |
| JP | 3-123310 A | 5/1991 |
| JP | 4-138407 A | 5/1992 |
| JP | 7-13079 A | 1/1995 |
| JP | 9-159917 A | 6/1997 |
| JP | 11-064733 A | 3/1999 |
| JP | 2000-284173 A | 10/2000 |
| JP | 2001-228396 A | 8/2001 |

* cited by examiner

*Primary Examiner*—Loha Ben
*Assistant Examiner*—William Choi
(74) *Attorney, Agent, or Firm*—Canon U.S.A. Inc IP Division

(57) ABSTRACT

A lens device having a function of varying a magnification of the lens device and a function of focusing includes, in the order from an object side to an image side, a first lens unit which has a positive optical power and which is fixed during the variation of magnification, a second lens unit which has a negative optical power and which moves during the variation of magnification, and a third lens unit which has a positive optical power and which is fixed during the variation of magnification. The third lens unit includes a first lens sub-unit which is fixed during focusing, a second lens sub-unit which has a positive optical power and which moves during focusing, and a third lens sub-unit which has a positive optical power and which is fixed during focusing, in that order from the object side to the image side.

8 Claims, 17 Drawing Sheets

$\delta = a - c$

LENS DEVICE AND SHOOTING SYSTEM

BACKGROUND OF THE INVENTION

1. Field of the Invention

The present invention relates to rear-focus zoom lenses (lens devices), and more specifically to a zoom lens used in a shooting apparatus, such as a television camera and a video camera.

2. Description of the Related Art

Shooting apparatuses, such as television cameras and video cameras, require large-aperture zoom lenses which provide high variable power ratios and high optical performance. In particular, color television cameras for broadcasting are preferably structured such that they can be easily operated and maneuvered, and accordingly, small solid-state imaging devices having a size of ⅔ or ½ inches are generally used. Imaging devices have a substantially constant resolution over the entire imaging area thereof, and it is therefore necessary that zoom lenses also have a substantially constant resolution from the center to the periphery of a view area.

Accordingly, in zoom lenses, it is important to accurately correct not only aberrations like spherical aberration, coma aberration, etc., but also aberrations asymmetric with respect to an optical axis, such as eccentric coma aberration which is generated due to manufacturing errors between components, so that high optical performance is obtained over the entire view area.

On the other hand, so-called four-unit zoom lenses including a first lens unit which is a positive lens unit and which is fixed during variation of magnification, a second lens unit (variator lens unit) which is a negative lens unit and which moves during the variation of magnification, a third lens unit (compensator lens unit) which is a negative lens unit and which performs image-plane correction during the variation of magnification, and a fourth lens unit (focus lens unit) which is a positive lens unit having an image-forming function, which is used for focusing, and which is fixed during the variation of magnification, in that order from an object side, are known in the art. The four-unit zoom lenses are small, and magnifications and performance thereof can be easily improved. Accordingly, the four-unit zoom lenses are often used as zoom lenses for broadcasting and professional purposes.

Examples of four-unit zoom lenses are disclosed in Japanese Patent Laid-Open No. 1-120522 (see line 16 in the lower right column of page 2 to line 2 in the upper left column of page 3 and FIG. 1), Japanese Patent Laid-Open No. 1-284818 (see lines 12 to 18 in the lower left column of page 2 and FIG. 1), Japanese Patent Laid-Open No. 2-100011 (see lines 11 to 19 in the lower right column of page 2 and FIG. 1), Japanese Patent Laid-Open No. 2-118510 (see lines 1 to 10 in the upper right column of page 3 and FIGS. 1(A) and 1(B)), Japanese Patent Laid-Open No. 2-208618 (see the third line from the bottom in the upper right column to line 7 in the lower left column of page 3 and FIG. 1), Japanese Patent Laid-Open No. 2-208619 (see lines 11 to 19 in the lower right column of page 2 and FIG. 1), Japanese Patent Laid-Open No. 2-208620 (see lines 11 to 19 in the lower right column of page 2 and FIG. 1), Japanese Patent Laid-Open No. 3-123310 (see lines 9 to 17 in the lower right column of page 2 and FIG. 1), Japanese Patent Laid-Open No. 3-145615 (see lines 3 to 11 in the lower right column of page 2 and FIGS. 1 to 8), and Japanese Patent Laid-Open No. 4-138407 (see lines 2 to 10 in the lower right column of page 2 and FIG. 1).

In addition, three-unit zoom lenses including a first lens unit which is a positive lens unit and which is fixed during the variation of magnification, a second lens unit (variator lens unit) which is a negative power and which moves during the variation of magnification, and a third lens unit which is a positive lens unit having an image-forming function and which is fixed during the variation of magnification, in that order from an object side, are also known in the art. The third lens unit includes a lens sub-unit (focus lens sub-unit) having a function of both focusing and performing image-plane correction during the variation of magnification. The three-unit zoom lenses have a relatively simple structure, and are therefore often used in commercial video cameras and the like.

Examples of three-unit zoom lenses having a structure in which a fixed lens sub-unit is provided at a position nearer to an image plane than the focus lens sub-unit to reduce the size and weight and to improve the performance are disclosed in, for example, Japanese Patent Laid-Open No. 8-5913 (see paragraphs 0013 to 0014 and FIGS. 2 to 14), Japanese Patent Laid-Open No. 9-159917 (see paragraphs 0012 to 0013 and FIG. 1), Japanese Patent No. 3097399 (see paragraphs 0014 to 0019 and FIGS. 1 to 4), and Japanese Patent Laid-Open No. 2000-284173 (see paragraphs 0032 to 0035 and FIG. 1).

In optical systems including a plurality of lens units as described above, the optical performance may be largely influenced by inclination, parallel eccentricity, etc., of each lens unit with respect to an optical axis caused by differences in precision between lens pieces and components in a lens barrel. In order to adjust the inclination, parallel eccentricity, etc., some zoom lenses include a mechanism for making one of the lens units eccentric in parallel or inclined with respect to the optical axis. The adjusting lens unit has a sufficient sensitivity to eccentric coma aberration, etc.

On the other hand, rear-focus zoom lenses in which a focus lens unit is disposed at a position nearer to an image plane than a variator lens unit are often used as auto-focus zoom lenses since the size and weight of the focus lens unit can be reduced.

In the four-unit zoom lenses disclosed in the above-mentioned publications, four lens units consisting of positive, negative, negative, and positive lens units are arranged in that order from the object side. However, since a converted inclination angle of incidence of an on-axis light ray on a side of the fourth lens unit which faces the image plane is large, when focusing is performed at the side facing the image plane, an incidence height of the on-axis light ray largely varies and variations in on-axis aberrations, such as spherical aberration and on-axis chromatic aberration, are increased. In addition, since the refractive power at a side of the fourth lens unit which faces the object is reduced, an additional positive lens must be disposed at a position nearer to the object than a diaphragm for causing a divergent light beam from the third lens unit to converge. In addition, the refractive power of the third lens unit must be reduced to reduce the divergence from the third lens unit. As a result, the amount of movement of the third lens unit is increased and the overall length of the zoom lens is also increased.

In addition, in the three-unit zoom lenses disclosed in the above-mentioned publications, three lens units consisting of positive, negative, and positive lens units are arranged in that order from the object side. However, since a converted inclination angle of incidence of an on-axis light ray on the focus lens sub-unit included in the third lens unit is large, when focusing is performed at the focus lens sub-unit, an incidence height of the on-axis light ray largely varies and variations in the on-axis aberrations, such as spherical aberration and on-axis chromatic aberration, are increased. In addition, according to Japanese Patent Laid-Open No. 2000-284173, a fixed lens sub-unit having a negative refractive power is disposed at a position nearer to the image plane than the focus lens sub-unit included in the third lens unit. Accordingly, the refractive power of the focus lens sub-unit is increased and the absolute values and variations in the on-axis aberrations, such as spherical aberration and on-axis chromatic aberration, are increased.

In addition, in rear-focus zoom lenses, when performance degradation at a wide-angle end due to manufacturing errors is to be corrected, rear-focus lens units are generally not suitable for use as adjustment lens units because they move.

In the three-unit zoom lenses commonly used in commercial video cameras and the like, eccentric aberration is often corrected by adjusting a fixed lens sub-unit included in the third lens unit. Alternatively, adjustment lens units for correcting the eccentric aberration may not be provided in view of the optical performance required by users and the product cost.

In comparison, in the four-unit zoom lenses commonly used for broadcasting and professional purposes, users require high optical performance, and therefore it is necessary to correct the eccentric aberration. In addition, an adjustment lens unit for correcting the eccentric aberration is preferably provided in the fourth lens unit as a fixed lens sub-unit. However, a diaphragm unit and a drive unit for electrically controlling the variation of magnification are disposed near the side of the fourth lens unit which faces the object, and it is not preferable to dispose the adjustment lens sub-unit at this position since the structure becomes complex.

SUMMARY OF THE INVENTION

The present invention is directed to a small rear-focus zoom lens which provides excellent optical performance.

More specifically, according to the present invention, a lens device having a function of varying a magnification of the lens device and a function of focusing includes, in the order from an object side to an image side, a first lens unit which has a positive optical power and which is fixed during the variation of magnification, a second lens unit which has a negative optical power and which moves during the variation of magnification, and a third lens unit which has a positive optical power and which is fixed during the variation of magnification. The third lens unit includes a first lens sub-unit which is fixed during focusing, a second lens sub-unit which has a positive optical power and which moves during focusing, and a third lens sub-unit which has a positive optical power and which is fixed during focusing, in that order from the object side to the image side.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Figure 1:
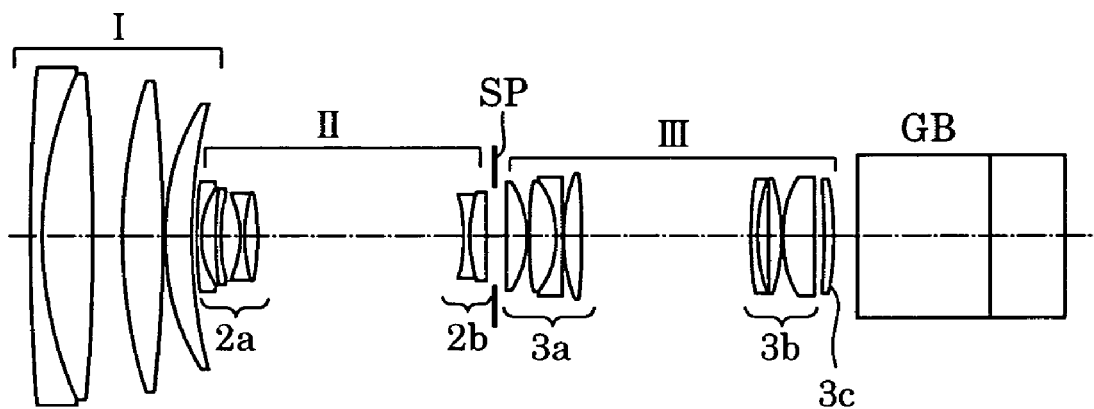
FIG. 1 is a sectional view of a zoom lens according to a first embodiment (numerical example 1) of the present invention at a wide-angle end.
Figure 2:
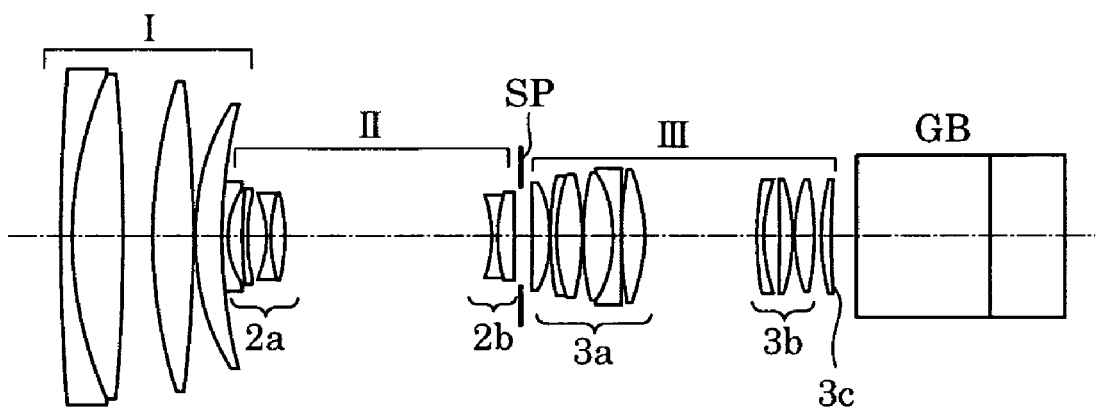
FIG. 2 is a sectional view of a zoom lens according to a second embodiment (numerical example 2) of the present invention at a wide-angle end.
Figure 3:
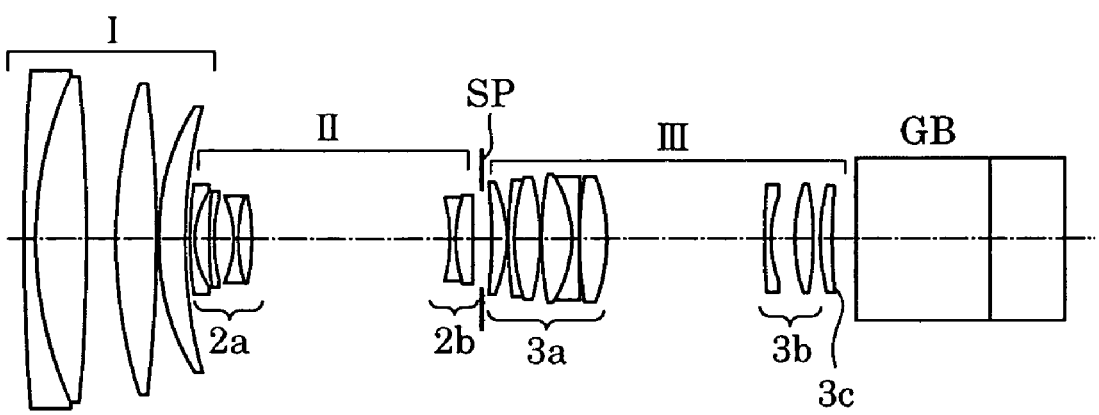
FIG. 3 is a sectional view of a zoom lens according to a third embodiment (numerical example 3) of the present invention at a wide-angle end.
Figure 4:
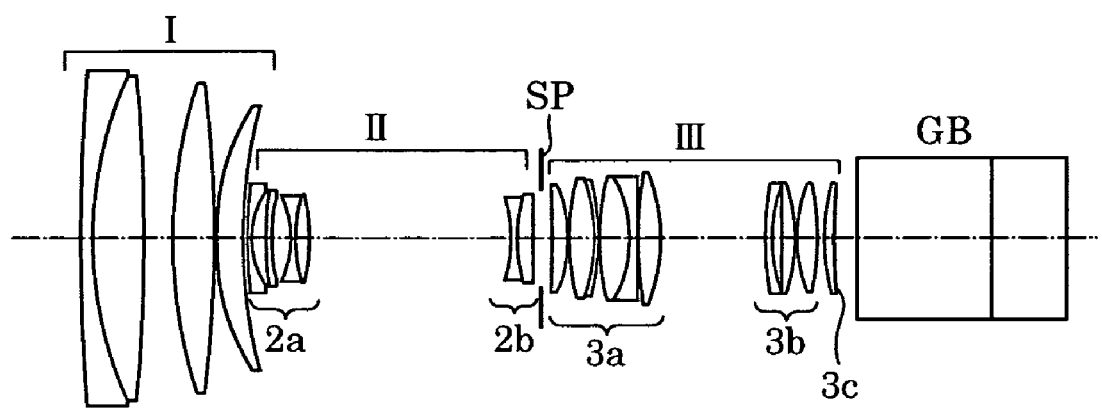
FIG. 4 is a sectional view of a zoom lens according to a fourth embodiment (numerical example 4) of the present invention at a wide-angle end.
Figure 5:
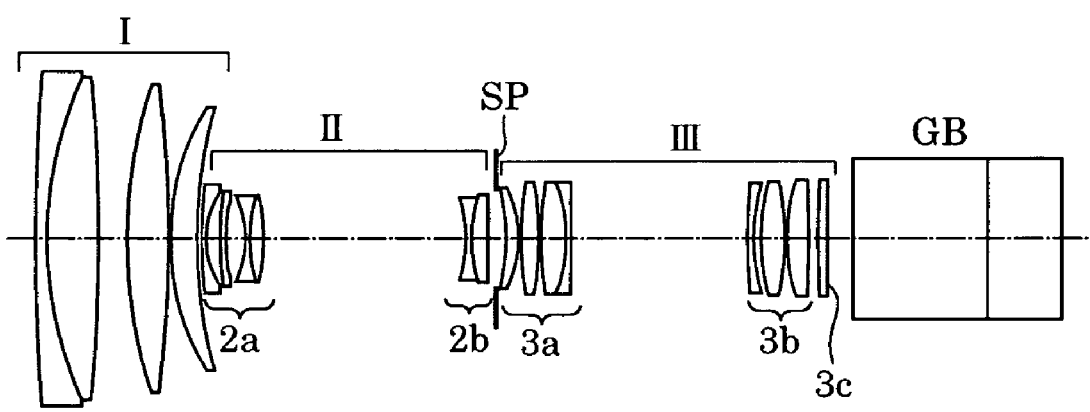
FIG. 5 is a sectional view of a zoom lens according to a fifth embodiment (numerical example 5) of the present invention at a wide-angle end.
Figure 6:
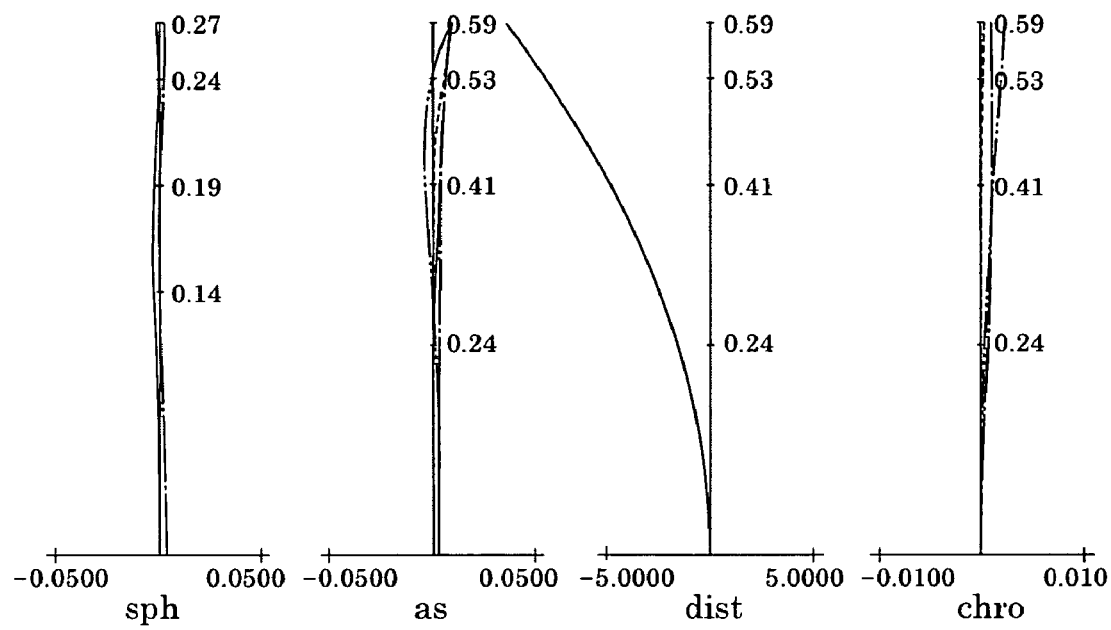
FIG. 6 is an aberration diagram according to numerical example 1 obtained when f=1 mm and the object distance is 0.3 m.
Figure 7:
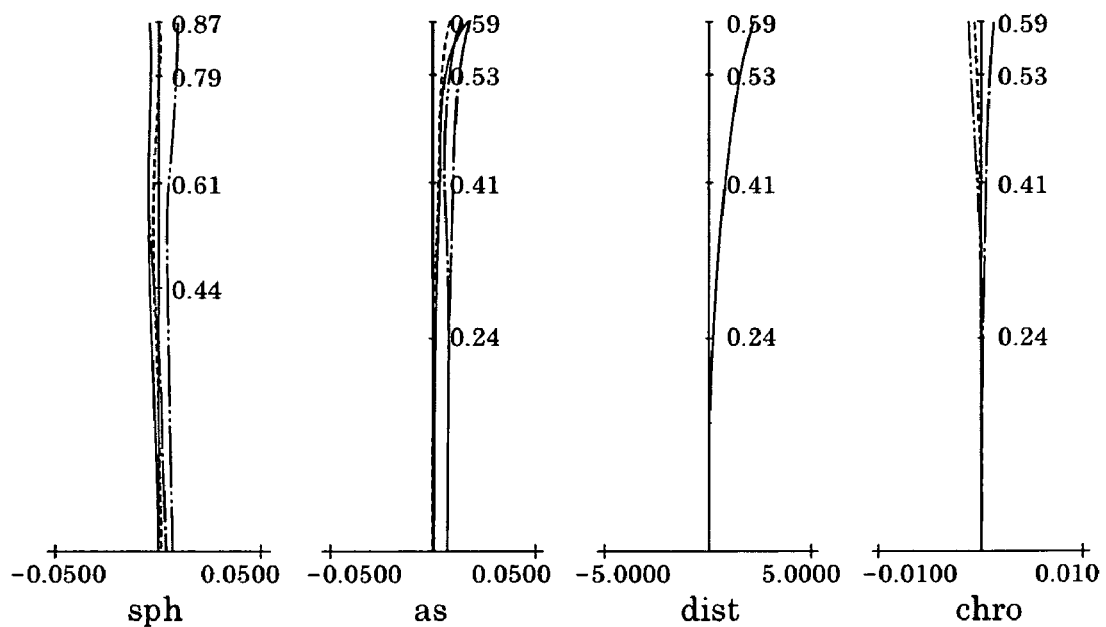
FIG. 7 is an aberration diagram according to numerical example 1 obtained when f=3.25 mm and the object distance is 0.3 m.
Figure 8A:
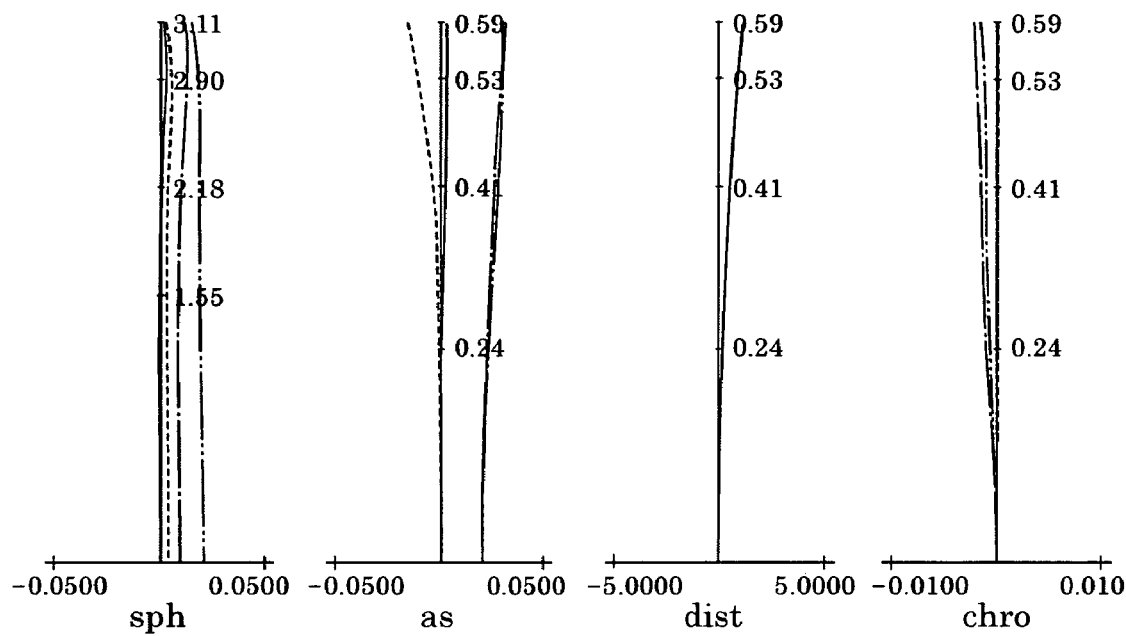
FIG. 8A is an aberration diagram according to numerical example 1 obtained when f=12.6 mm and the object distance is 0.3 m.
Figure 8B:
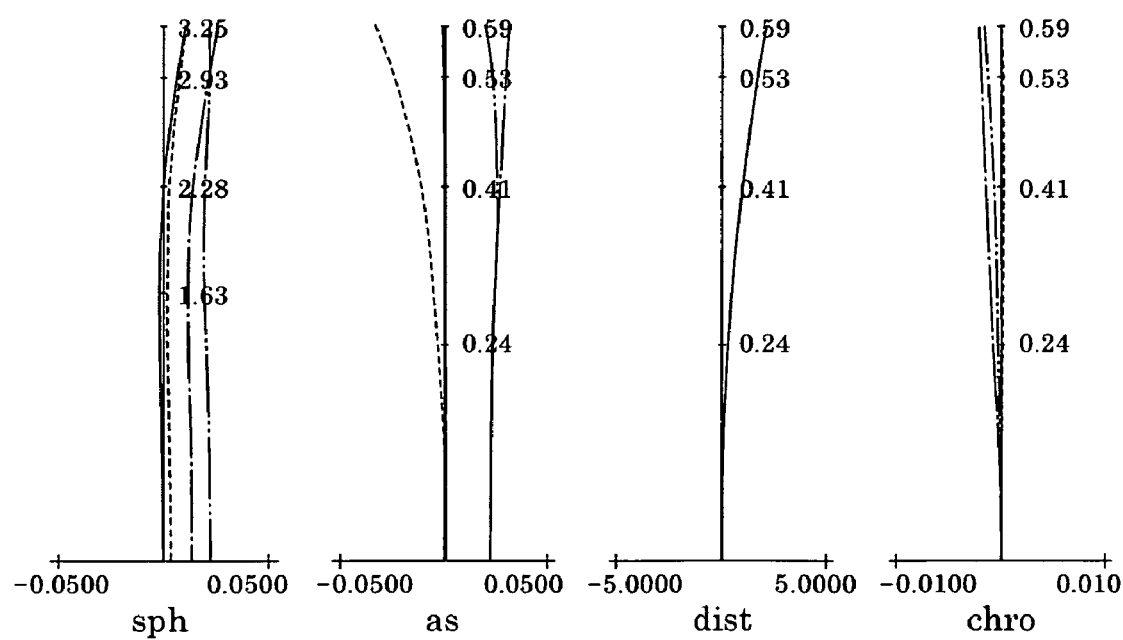
FIG. 8B is an aberration diagram according to numerical example 1 obtained when f=12.6 mm and the object distance is infinite.
Figure 8C:
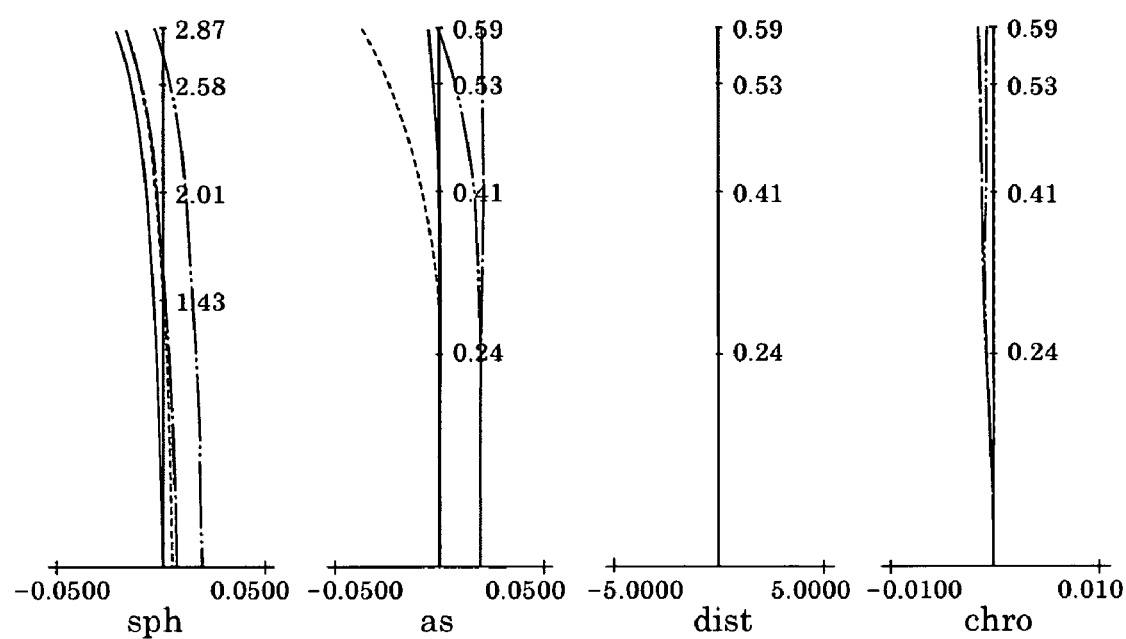
FIG. 8C is an aberration diagram according to numerical example 1 obtained when f=12.6 mm and the object distance is 0.11 m.
Figure 9:
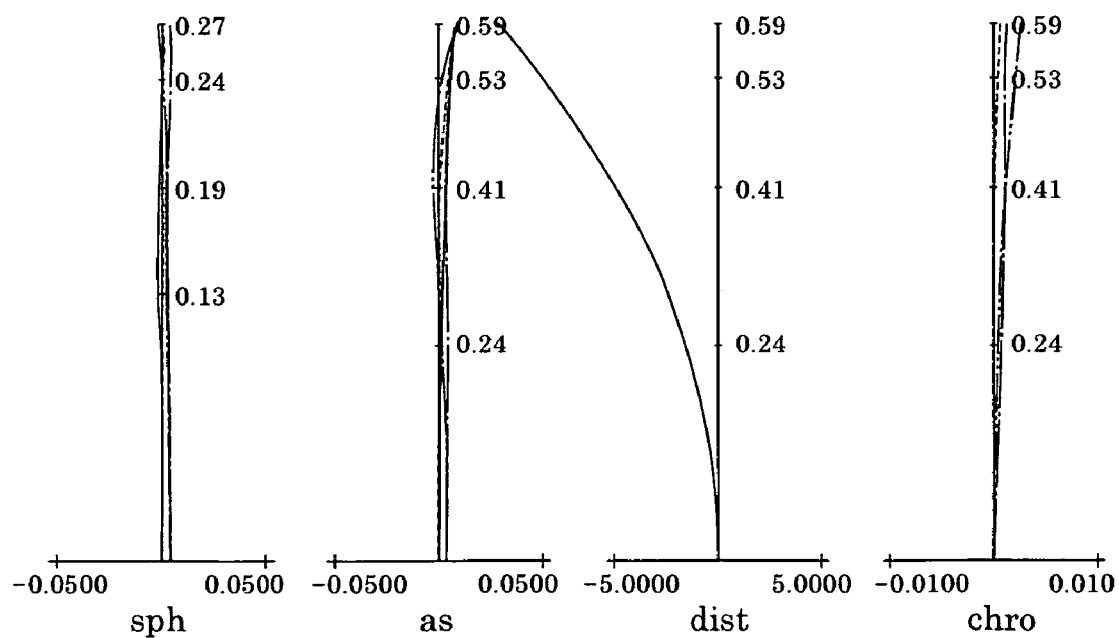
FIG. 9 is an aberration diagram according to numerical example 2 obtained when f=1 mm and the object distance is 0.3 m.
Figure 10:
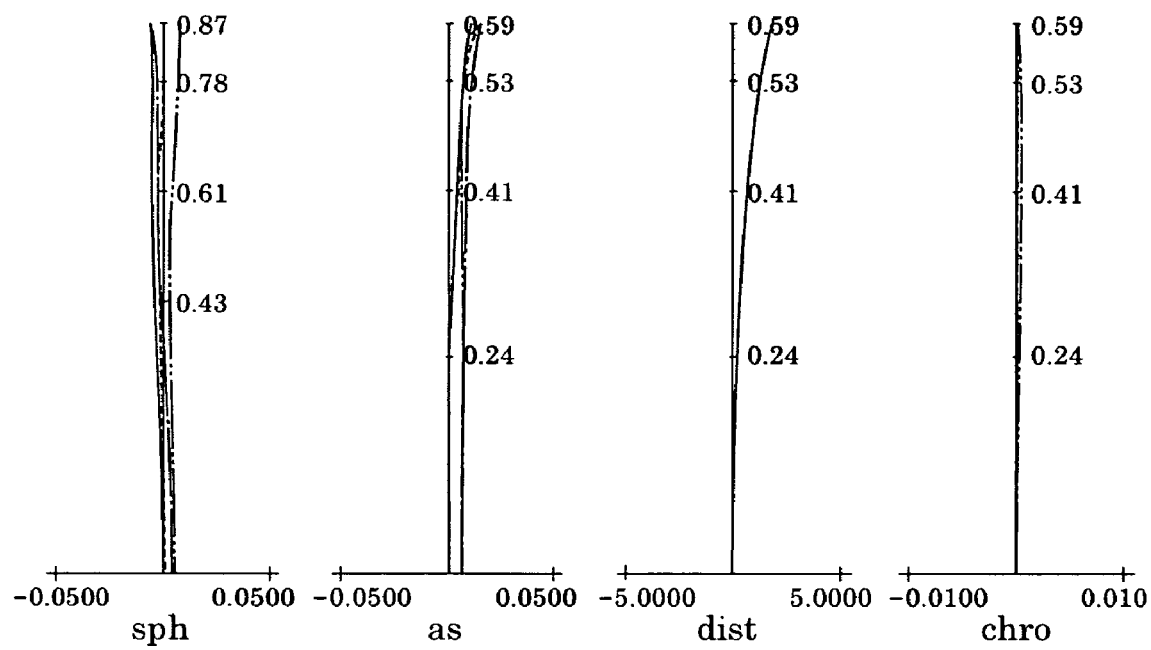
FIG. 10 is an aberration diagram according to numerical example 2 obtained when f=3.25 mm and the object distance is 0.3 m.
Figure 11A:
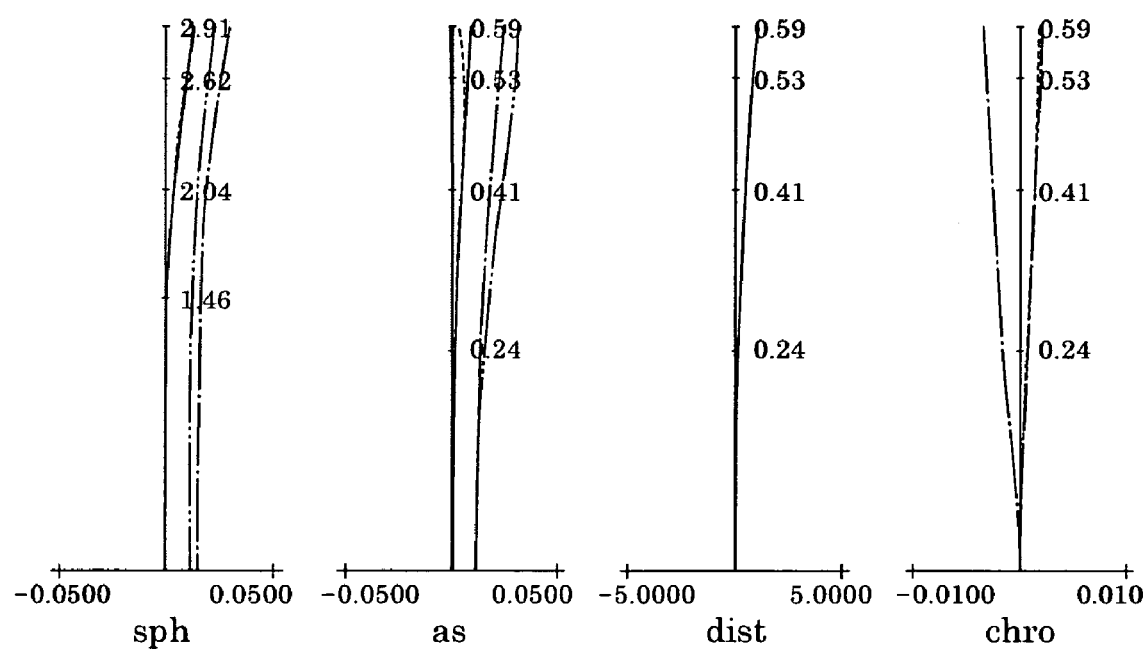
FIG. 11A is an aberration diagram according to numerical example 2 obtained when f=12.6 mm and the object distance is 0.3 m.
Figure 11B:
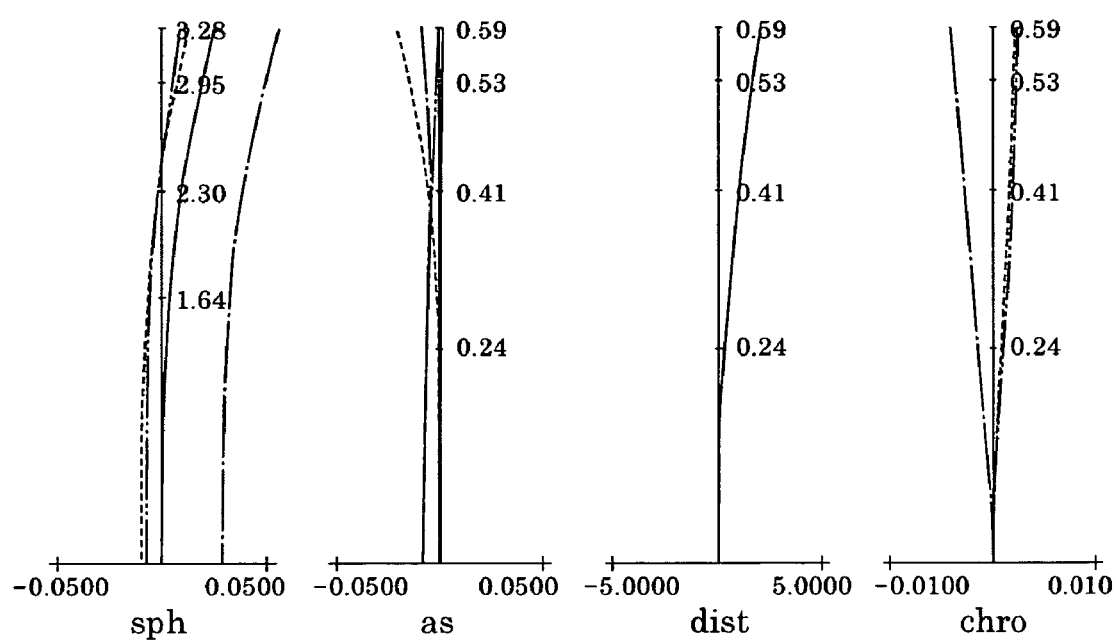
FIG. 11B is an aberration diagram according to numerical example 2 obtained when f=12.6 mm and the object distance is infinite.
Figure 11C:
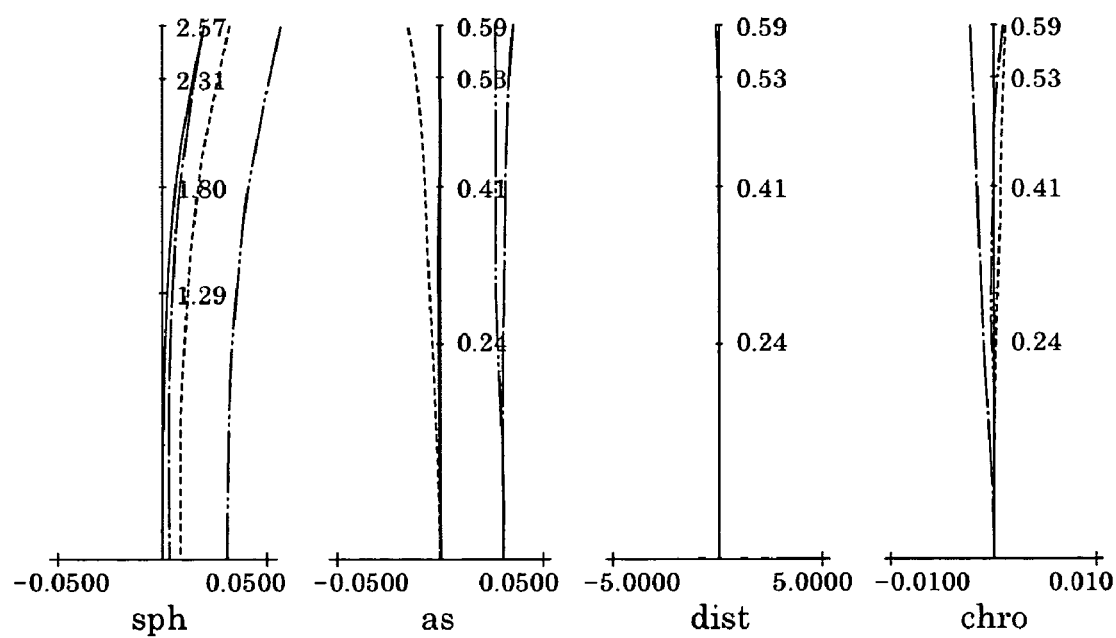
FIG. 11C is an aberration diagram according to numerical example 2 obtained when f=12.6 mm and the object distance is 0.11 m.
Figure 12:
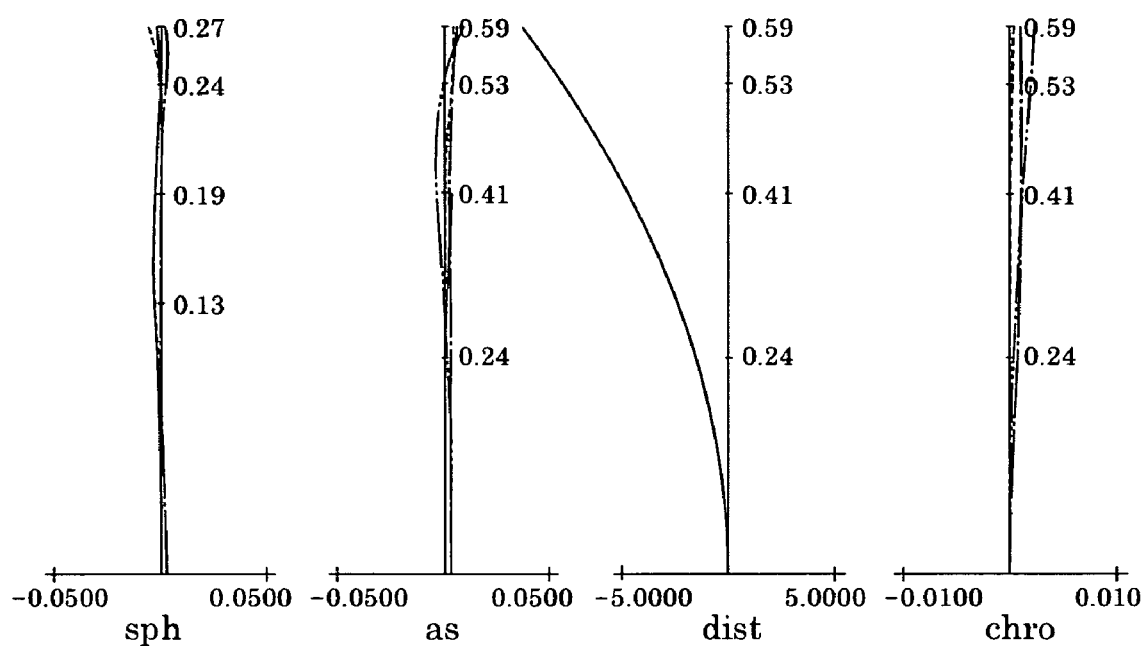
FIG. 12 is an aberration diagram according to numerical example 3 obtained when f=1 mm and the object distance is 0.3 m.
Figure 13:
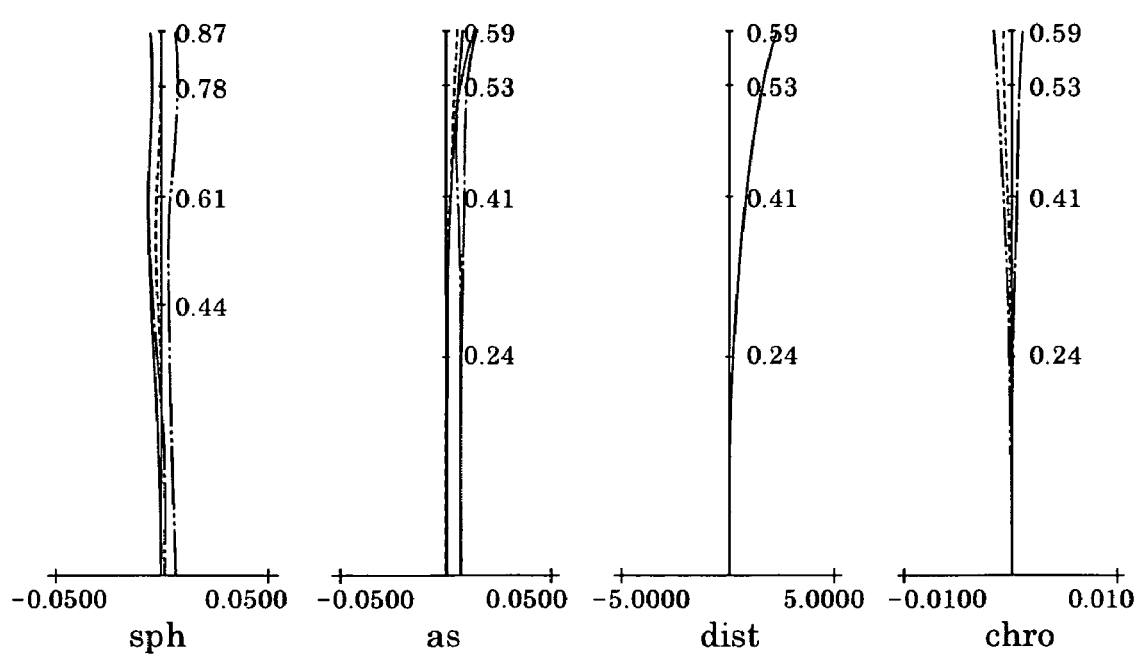
FIG. 13 is an aberration diagram according to numerical example 3 obtained when f=3.25 mm and the object distance is 0.3 m.
Figure 14A:
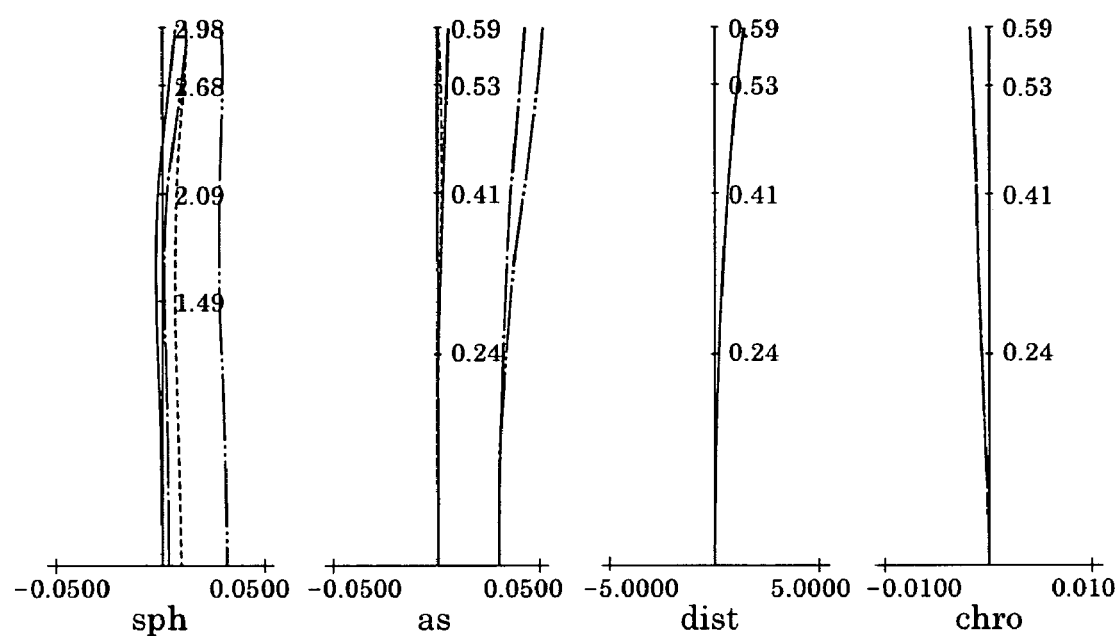
FIG. 14A is an aberration diagram according to numerical example 3 obtained when f=12.6 mm and the object distance is 0.3 m.
Figure 14B:
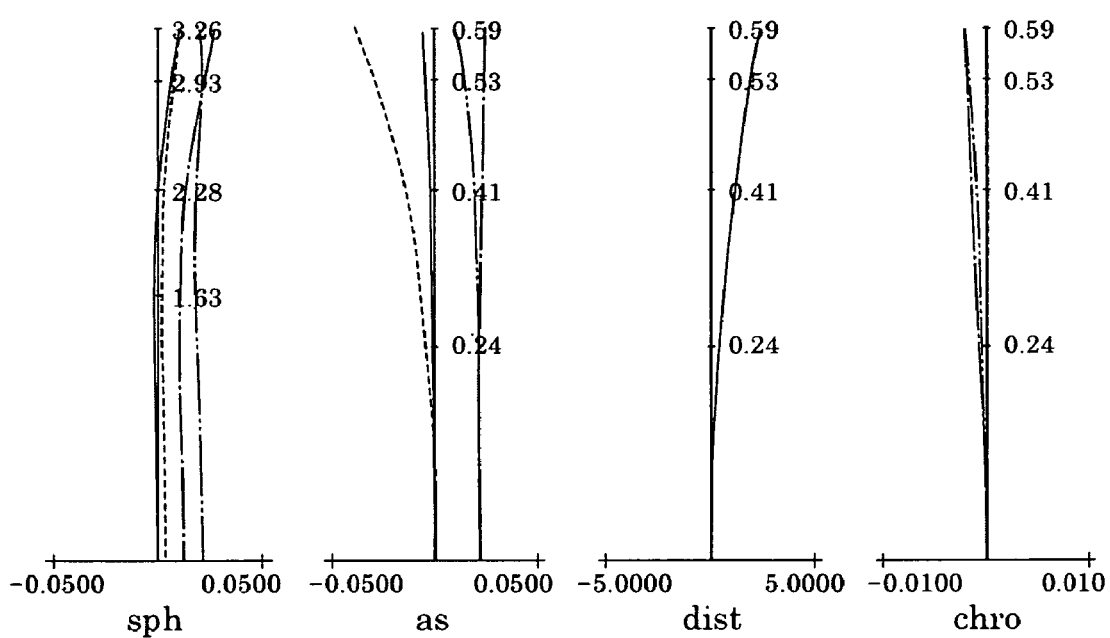
FIG. 14B is an aberration diagram according to numerical example 3 obtained when f=12.6 mm and the object distance is infinite.
Figure 14C:
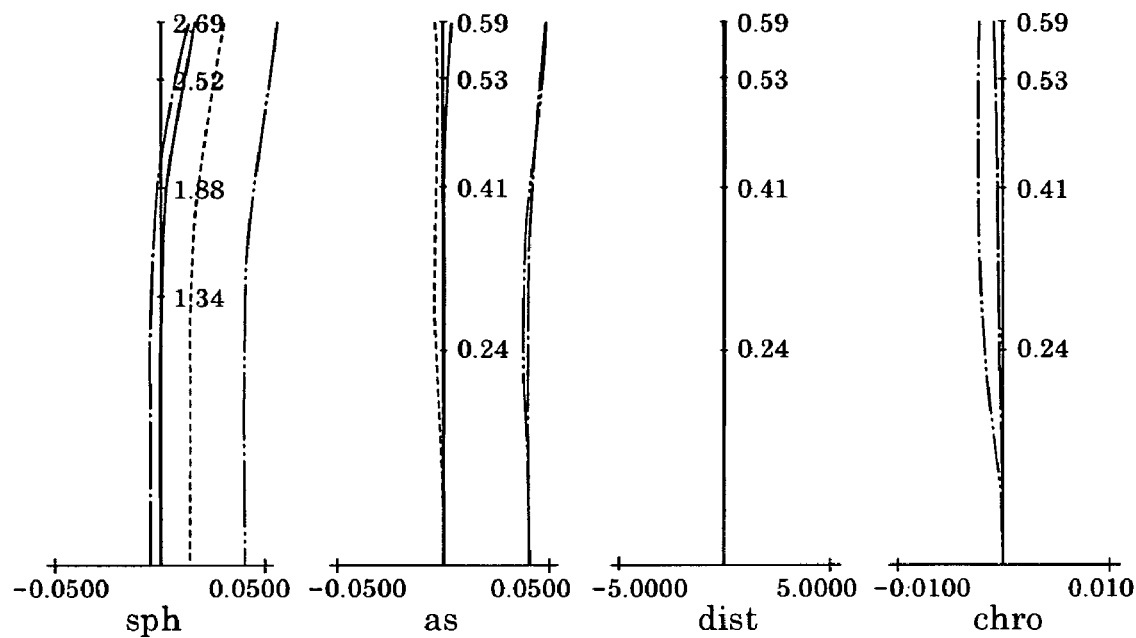
FIG. 14C is an aberration diagram according to numerical example 3 obtained when f=12.6 mm and the object distance is 0.11 m.
Figure 15:
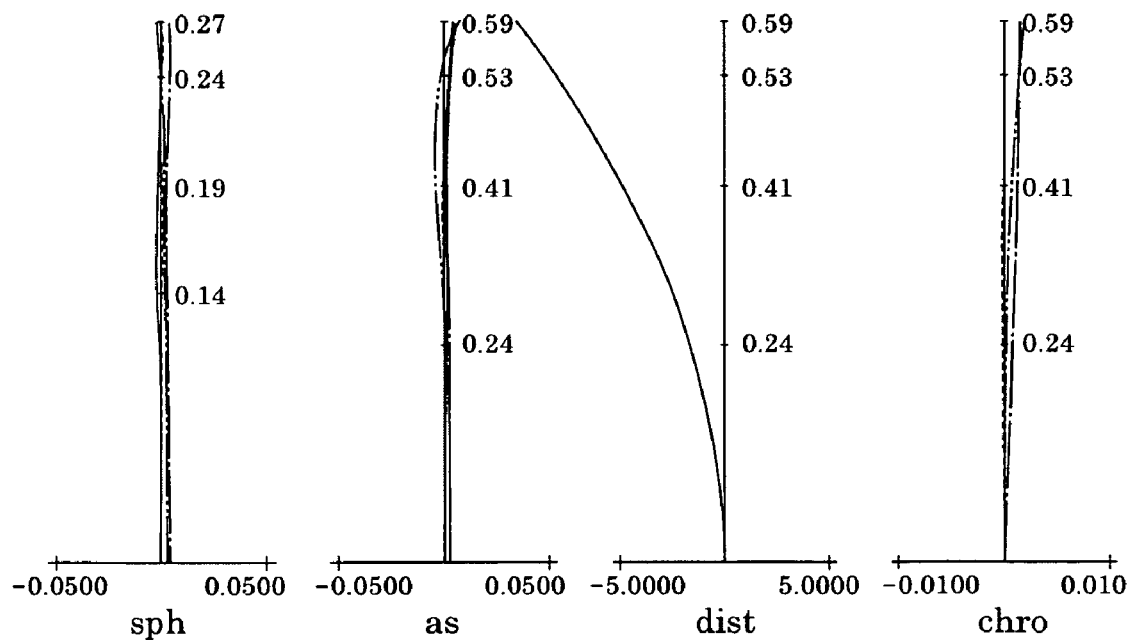
FIG. 15 is an aberration diagram according to numerical example 4 obtained when f=1 mm and the object distance is 0.3 m.
Figure 16:
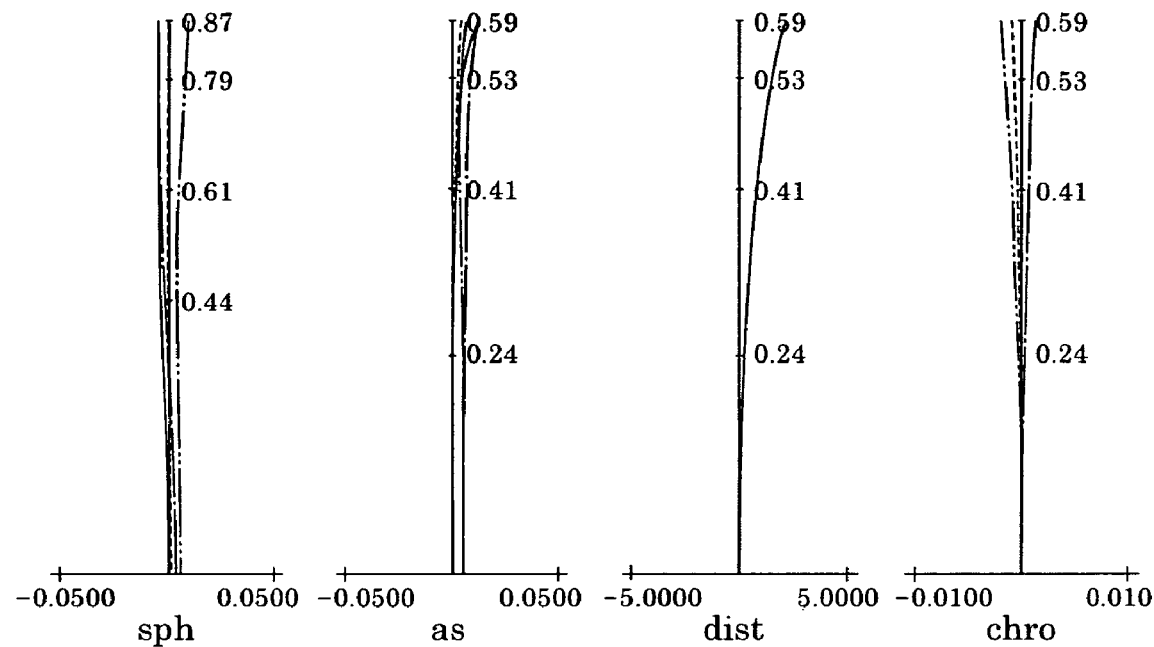
FIG. 16 is an aberration diagram according to numerical example 4 obtained when f=3.25 mm and the object distance is 0.3 m.
Figure 17A:
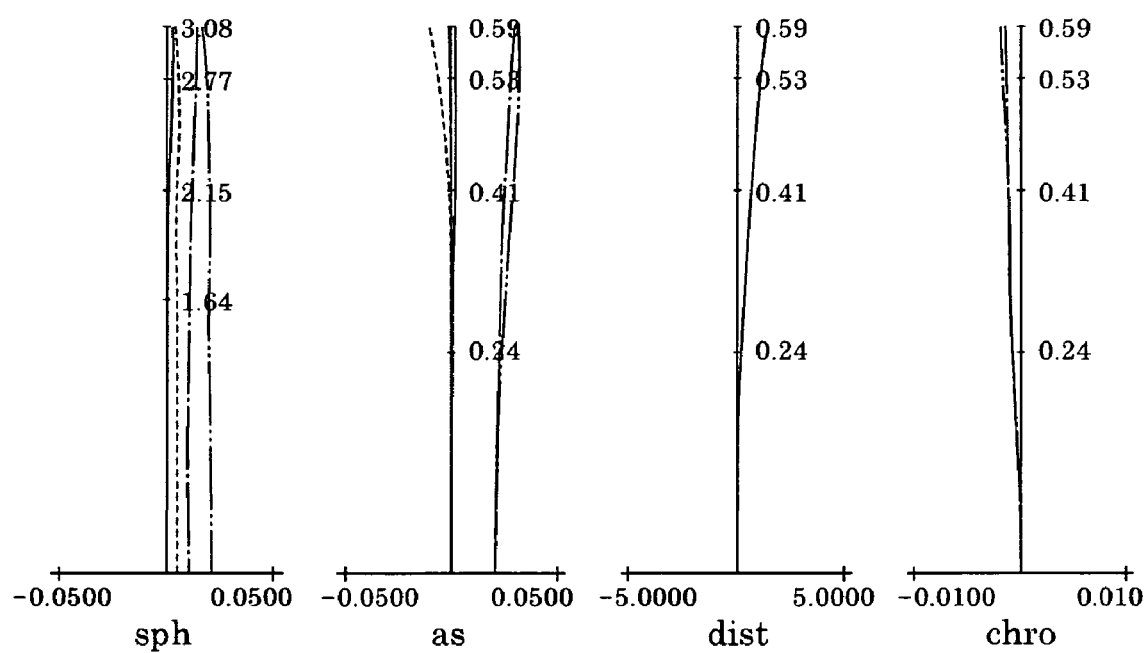
FIG. 17A is an aberration diagram according to numerical example 4 obtained when f=12.6 mm and the object distance is 0.3 m.
Figure 17B:
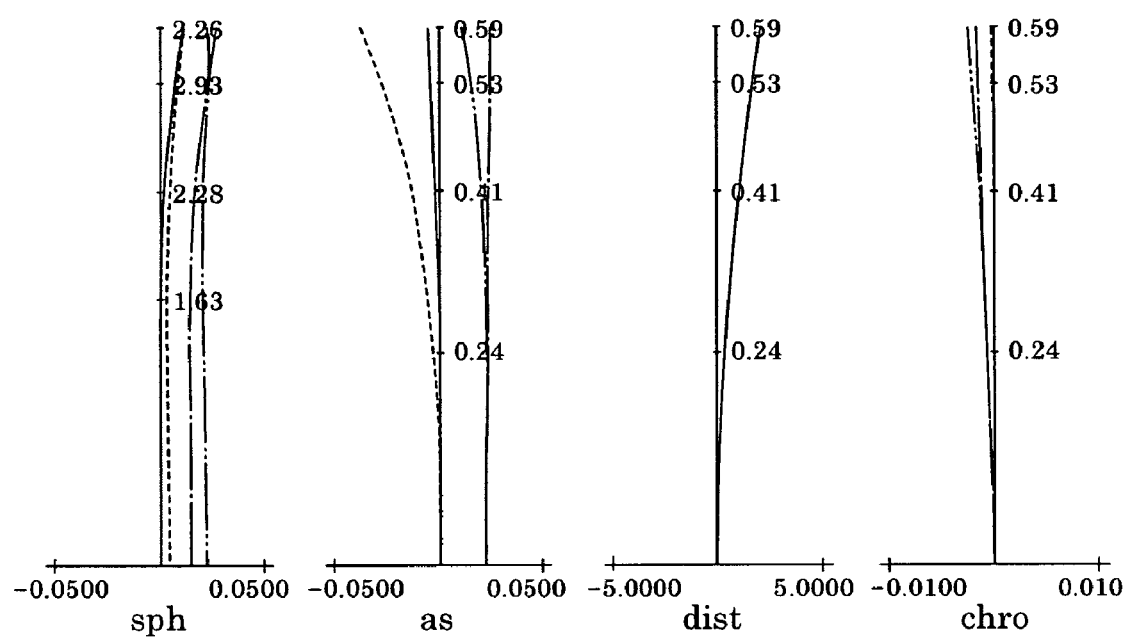
FIG. 17B is an aberration diagram according to numerical example 4 obtained when f=12.6 mm and the object distance is infinite.
Figure 17C:
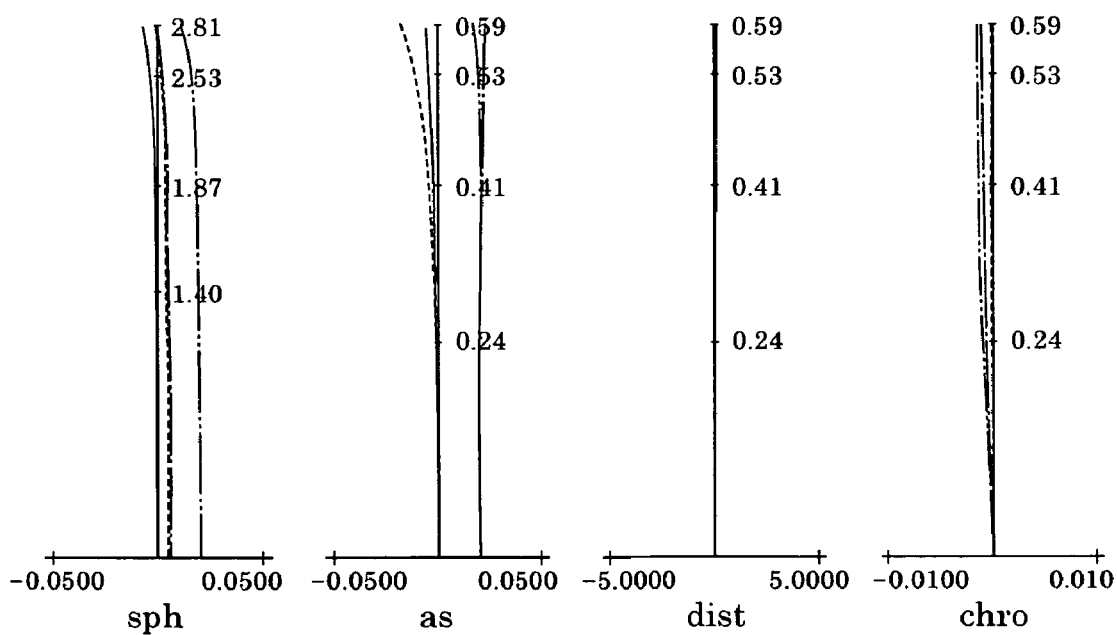
FIG. 17C is an aberration diagram according to numerical example 4 obtained when f=12.6 mm and the object distance is 0.11 m.
Figure 18:
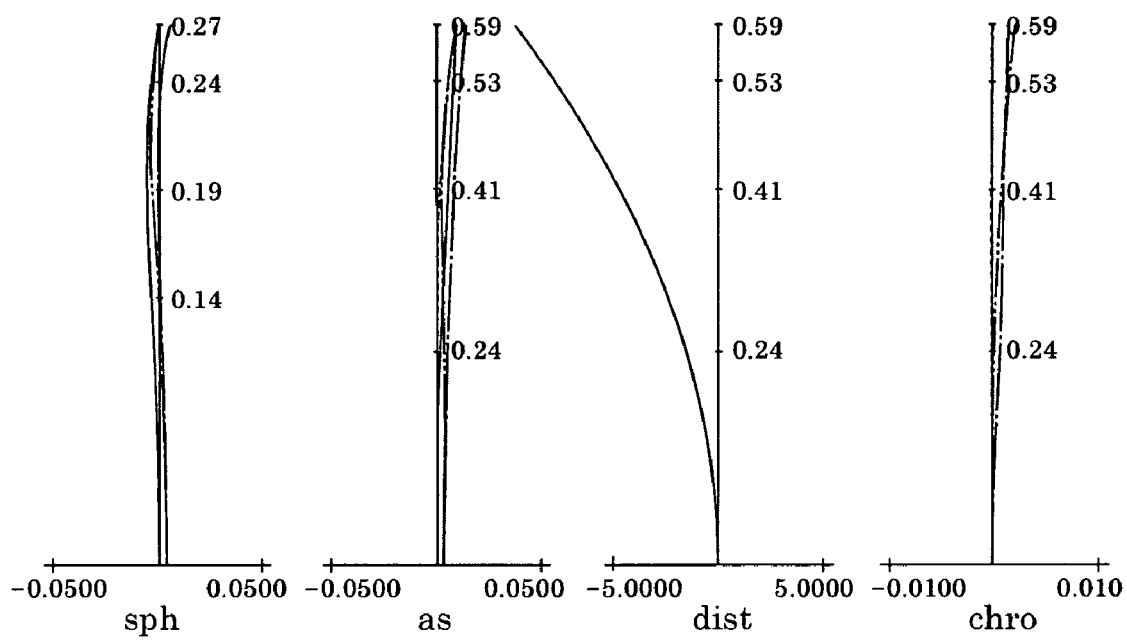
FIG. 18 is an aberration diagram according to numerical example 5 obtained when f=1 mm and the object distance is 0.3 m.
Figure 19:
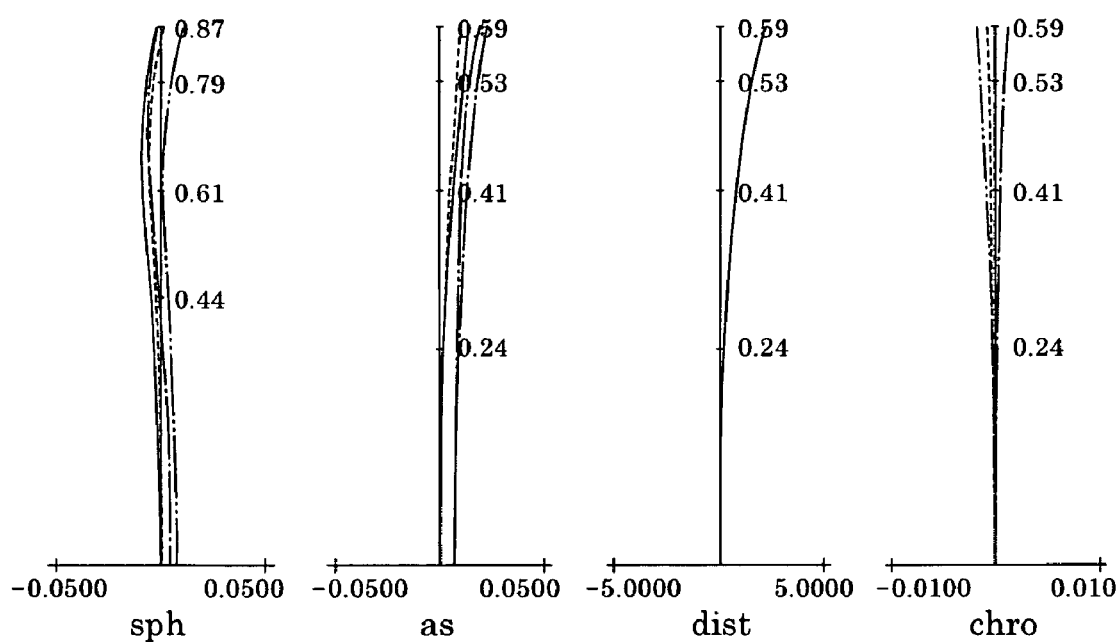
FIG. 19 is an aberration diagram according to numerical example 5 obtained when f=3.25 mm and the object distance is 0.3 m.
Figure 20A:
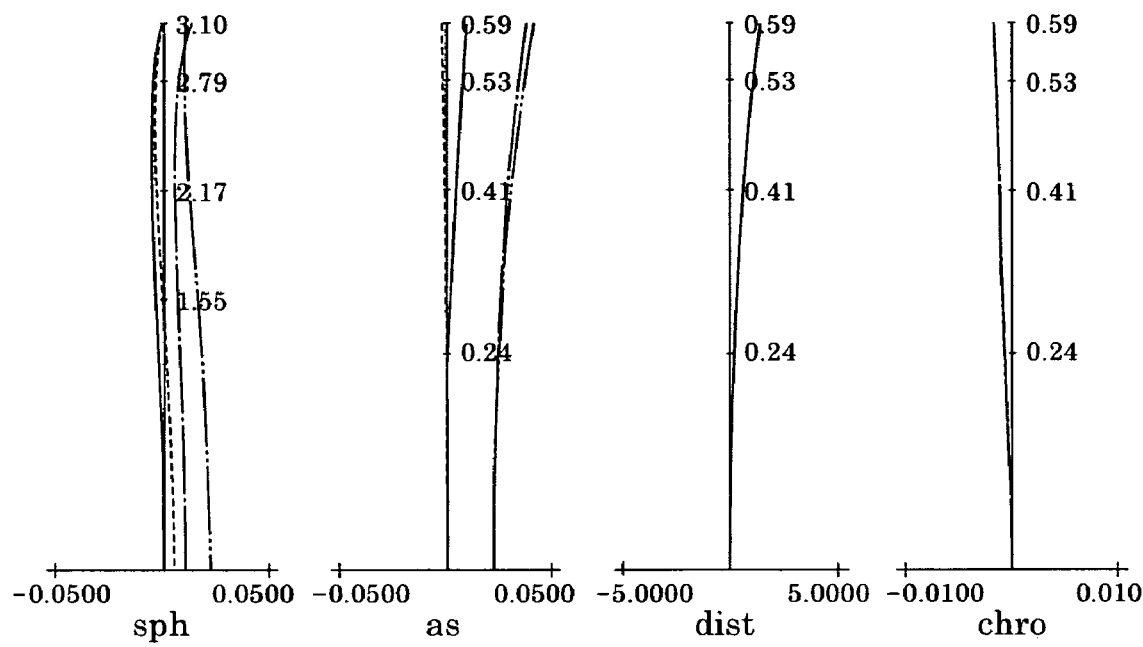
FIG. 20A is an aberration diagram according to numerical example 5 obtained when f=12.6 mm and the object distance is 0.3 m.
Figure 20B:
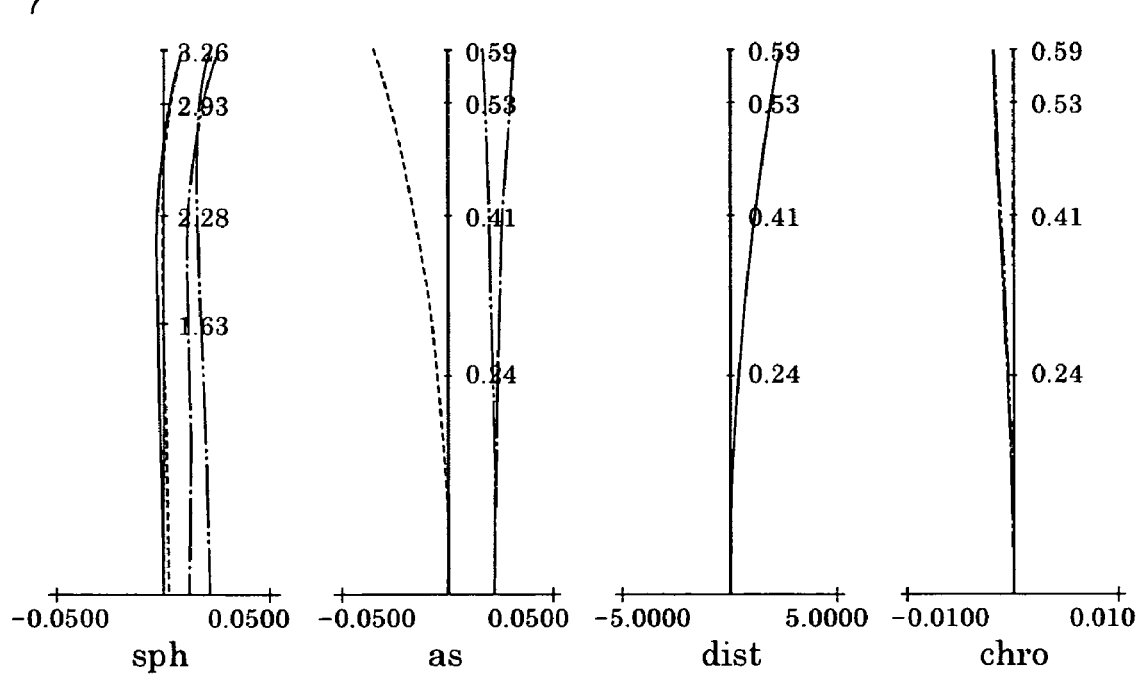
FIG. 20B is an aberration diagram according to numerical example 5 obtained when f=12.6 mm and the object distance is infinite.
Figure 20C:
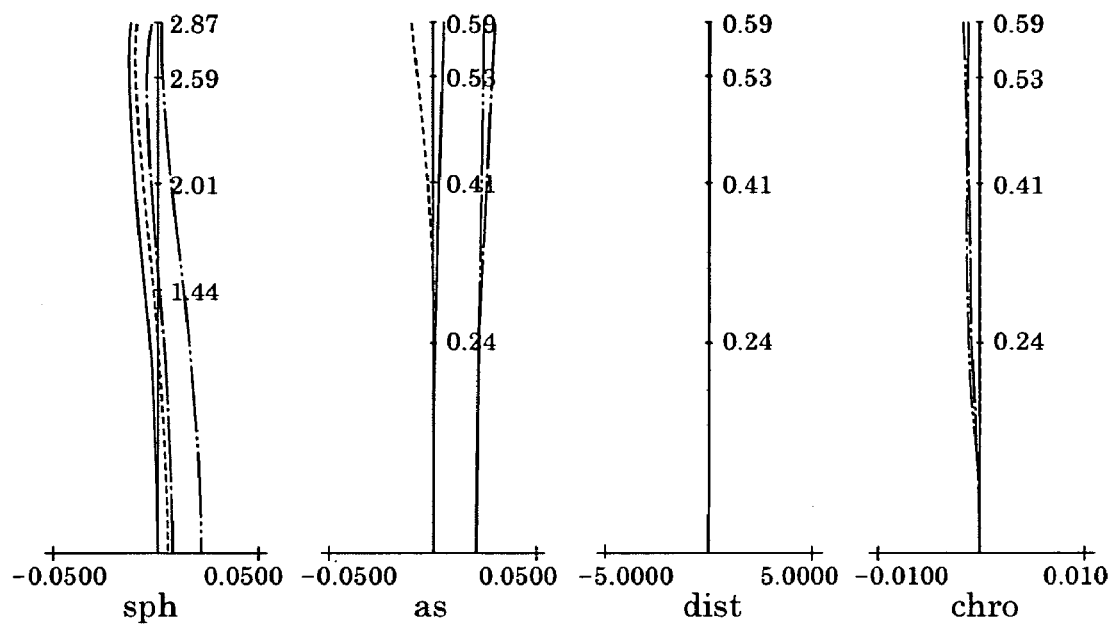
FIG. 20C is an aberration diagram according to numerical example 5 obtained when f=12.6 mm and the object distance is 0.11 m.

Embodiments of the present invention will be described below with reference to the accompanying drawings. FIG. 1 is a sectional view showing the structure of an optical system of a zoom lens according to a first embodiment of the present invention, FIG. 2 is a sectional view showing the structure of an optical system of a zoom lens according to a second embodiment of the present invention, FIG. 3 is a sectional view showing the structure of an optical system of a zoom lens according to a third embodiment of the present invention, FIG. 4 is a sectional view showing the structure of an optical system of a zoom lens according to a fourth embodiment of the present invention, and FIG. 5 is a sectional view showing the structure of an optical system of a zoom lens according to a fifth embodiment of the present invention. The sectional views of FIGS. 1 to 5 correspond to the wide-angle end and infinite object distance.

In each embodiment, the zoom lens is a rear-focus zoom lens including a lens unit which moves for varying the magnification and a lens unit (lens sub-unit) which moves for focal point adjustment and which is disposed nearer to an image plane than the lens unit which moves for varying the magnification. More specifically, the zoom lens includes a first lens unit I which has a positive refractive power as an optical power (reciprocal of focal length) and which is fixed during the variation of magnification, a second lens unit II which has a negative refractive power and which moves during the variation of magnification, a diaphragm SP for adjusting the amount of light, and a third lens unit III which has a positive refractive power, which is used for forming an image, and which is fixed during the variation of magnification, in that order from an object side.

Although the optical system of the zoom lens in each embodiment includes three lens units I to III, the second lens unit II includes a lens sub-unit (fourth lens sub-unit) $2a$ which has a negative refractive power and which moves for varying the magnification and a lens sub-unit (fifth lens sub-unit) $2b$ which also has a negative refractive power and which moves for correcting a displacement of an image plane caused when the magnification is varied, in that order from an object side. Accordingly, these sub-units are considered as independent lens units, and thus the zoom lens according to each embodiment is a four-unit zoom lens including four lens units.

In the figures, GB denotes a glass block, such as a color separation prism, provided on an imaging device to which the zoom lens is attached or integrated.

The third lens unit includes a lens sub-unit $3a$ (first lens sub-unit) which is fixed during the focal point adjustment (focusing), a lens sub-unit $3b$ (second lens sub-unit) which moves during the focal point adjustment, and a lens sub-unit $3c$ (third lens sub-unit) which is fixed during the focal point adjustment, in that order from the object side. The lens sub-units $3b$ and $3c$ have positive refractive powers., and the refractive power of the lens sub-unit $3b$ is higher than that of the lens sub-unit $3c$.

When the focal length of the overall zoom lens system at the wide-angle end is standardized to 1 and paraxial tracing is performed, the following expressions are preferably satisfied:

$$0 < \alpha_{3b} < 0.35 \qquad (1)$$

$$0.1 < \phi_{3c}/\phi_{3b} < 0.8 \qquad (2)$$

$$0.09 < \phi_{3b} < 0.19 \qquad (3)$$

where, $\alpha_{3b}$: converted inclination angle of incidence of an on-axis light ray on the lens sub-unit $3b$, $\phi_{3b}$: refractive power of the lens sub-unit $3b$, and $\phi_{3c}$: refractive power of the lens sub-unit $3c$.

Expression (1) shows a condition regarding the converted inclination angle of incidence of the on-axis light ray on the lens sub-unit $3b$, and sensitivity $\Delta sk$ to back focus of the lens sub-unit $3b$ is generally expressed as follows:

$$\Delta sk = \alpha_{3b}'^2 - \alpha_{3b}^2 \qquad (4)$$

where $\alpha_{3b}$ and $\alpha_{3b}'$ are the converted inclination angle of incidence and the converted angle of emission, respectively, of the on-axis light ray on the lens sub-unit $3b$.

If, for example, $\alpha_{3b}'$ is indefinite from the refractive power of the lens sub-unit $3c$ and the necessity that back focus for the overall zoom lens be ensured, the sensitivity $\Delta sk$ to the back focus can be ensured by setting the absolute value of $\alpha_{3b}$ low. If the converted inclination angle of incidence of the on-axis light ray on the lens sub-unit $3b$ is reduced to below the lower limit in Expression (1), the refractive power of the lens sub-unit $3b$ is increased and the curvature of each lens element included in the lens sub-unit $3b$ is also increased. Accordingly, the weight and aberrations are increased, and variations in the aberrations during the focal point adjustment are also increased. If the converted inclination angle of incidence of the on-axis light ray on the lens sub-unit $3b$ is increased to above the upper limit in Expression (1), the refractive power of the lens sub-unit $3a$ is increased and aberrations are also increased. In addition, the sensitivity to back focus of the lens sub-unit 3b is reduced and the driving stroke of the lens sub-unit 3b during the focal point adjustment is increased. As a result, the overall length of the zoom lens is increased.

Expression (2) shows a condition regarding the ratio of the refractive power of the lens sub-unit 3c to that of the lens sub-unit 3b. If the refractive power of the lens sub-unit 3c is reduced with respect to that of the lens sub-unit 3b and the ratio is reduced to below the lower limit in Expression (2), a large amount of eccentricity is required for correcting the aberrations at the wide-angle end. In addition, if the refractive power of the lens sub-unit 3b is increased with respect to that of the lens sub-unit 3c and the ratio is reduced to below the lower limit in Expression (2), the curvature of each lens element included in the lens sub-unit 3b is increased since the refractive power of the lens sub-unit 3b is increased. Accordingly, the weight and the aberrations are increased, and variations in the aberrations during the focal point adjustment are also increased.

If the refractive power of the lens sub-unit 3b is reduced with respect to that of the lens sub-unit 3c and the ratio is increased to above the upper limit in Expression (2), the sensitivity to back focus of the lens sub-unit 3b is reduced and the driving stroke of the lens sub-unit 3b during the focal point adjustment is increased. As a result, the overall length of the zoom lens is increased. In addition, if the refractive power of the lens sub-unit 3c is increased with respect to that of the lens sub-unit 3b and the ratio is increased to above the upper limit in Expression (2), it becomes difficult to ensure the required back focus. In addition, when the aberration at the wide-angle end is corrected by making one of the lens units eccentric, it is difficult to adjust the amount of eccentricity since the sensitivity is too high.

Expression (3) shows a condition regarding the refractive power of the lens sub-unit 3b. When the refractive power of the lens sub-unit 3b is reduced to below the lower limit in Expression (3), the sensitivity to back focus of the lens sub-unit 3b is reduced and the driving stroke of the lens sub-unit 3b during the focal point adjustment is increased. As a result, the overall length of the zoom lens is increased. In addition, when the refractive power of the lens sub-unit 3b is increased to above the upper limit in Expression (3), the curvature of each lens element included in the lens sub-unit 3b is increased. Accordingly, the weight of the lens sub-unit 3b and the aberrations are increased, and variations in the aberrations during focusing are also increased.

Preferably, the eccentric aberration at the wide-angle end is corrected by making the lens sub-unit 3c eccentric (parallel or oblique) with respect to the optical axis of the zoom lens. In such a case, the adjustment lens unit is positioned nearest to the image plane in the zoom lens, and is fixed during the variation of magnification or the focal point adjustment is performed. Accordingly, when a simple adjustment mechanism is provided in the zoom lens, even if a drive unit for controlling the variation of magnification and the focal point adjustment is attached to the zoom lens, the eccentric aberration can be easily corrected with out removing the drive unit. Thus, excellent optical performance can be provided.

The above-described adjustment mechanism will be described below. A mechanism shown in FIG. 23A which adjusts the amount of parallel eccentricity of the lens sub-unit 3c or a mechanism shown in FIG. 23B which adjusts the amount of oblique eccentricity of the lens sub-unit 3c may be provided as the adjustment mechanism.

Figure 23A:
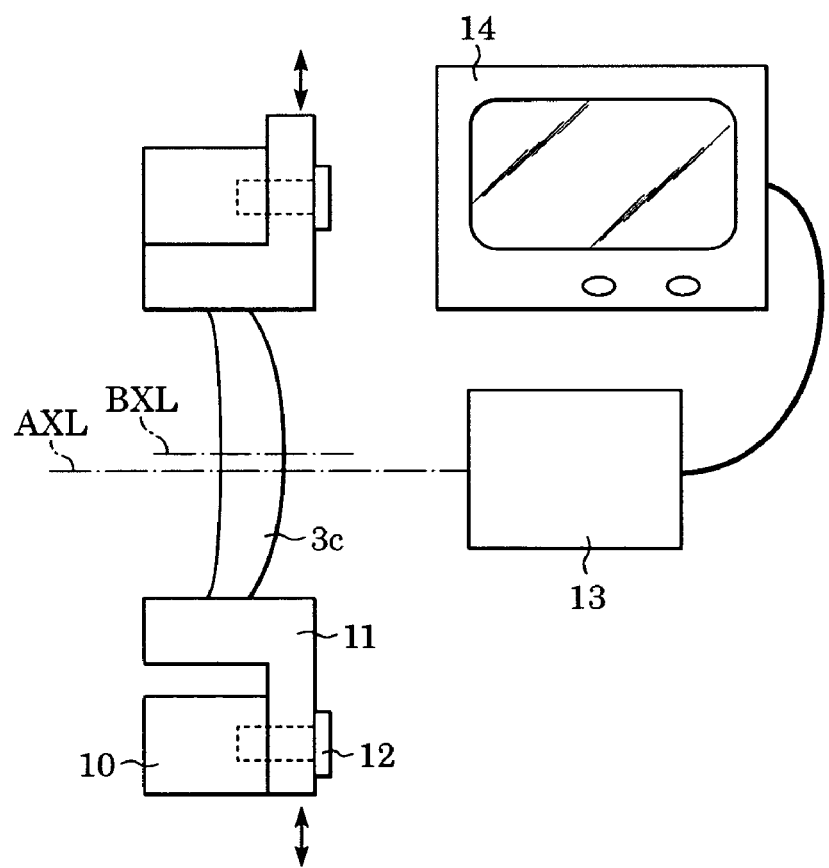
FIG. 23A is a schematic diagram showing an eccentricity adjustment mechanism according to the first to fifth embodiments.

In FIG. 23A, reference numeral 10 denotes the main body of the zoom lens and reference numeral 11 denotes a lens barrel which retains the lens sub-unit 3c and which is attached to the main body 10 with a screw 12. In addition, reference numeral 13 denotes a camera which observes the image-forming state and reference numeral 14 denotes a monitor which displays the information obtained by the camera 13. An adjuster loosens the screw 12 and adjusts the image-forming state by making the barrel 11 eccentric in parallel with a tool or the like while viewing the monitor 14. More specifically, the adjustment is roughly made while viewing the spot shape at the center with a collimator or an autocollimation bench, and then a further adjustment is made such that central flow (central coma) and partial blurring (asymmetry of projection resolution) at the periphery are balanced in projection. Then, the screw 12 is tightened again to fix the barrel 11. In addition, the amount and direction of parallel eccentricity of an optical axis BXL of the lens sub-unit 3c with respect to an optical axis AXL of the zoom lens can be adjusted arbitrarily.

Figure 23B:
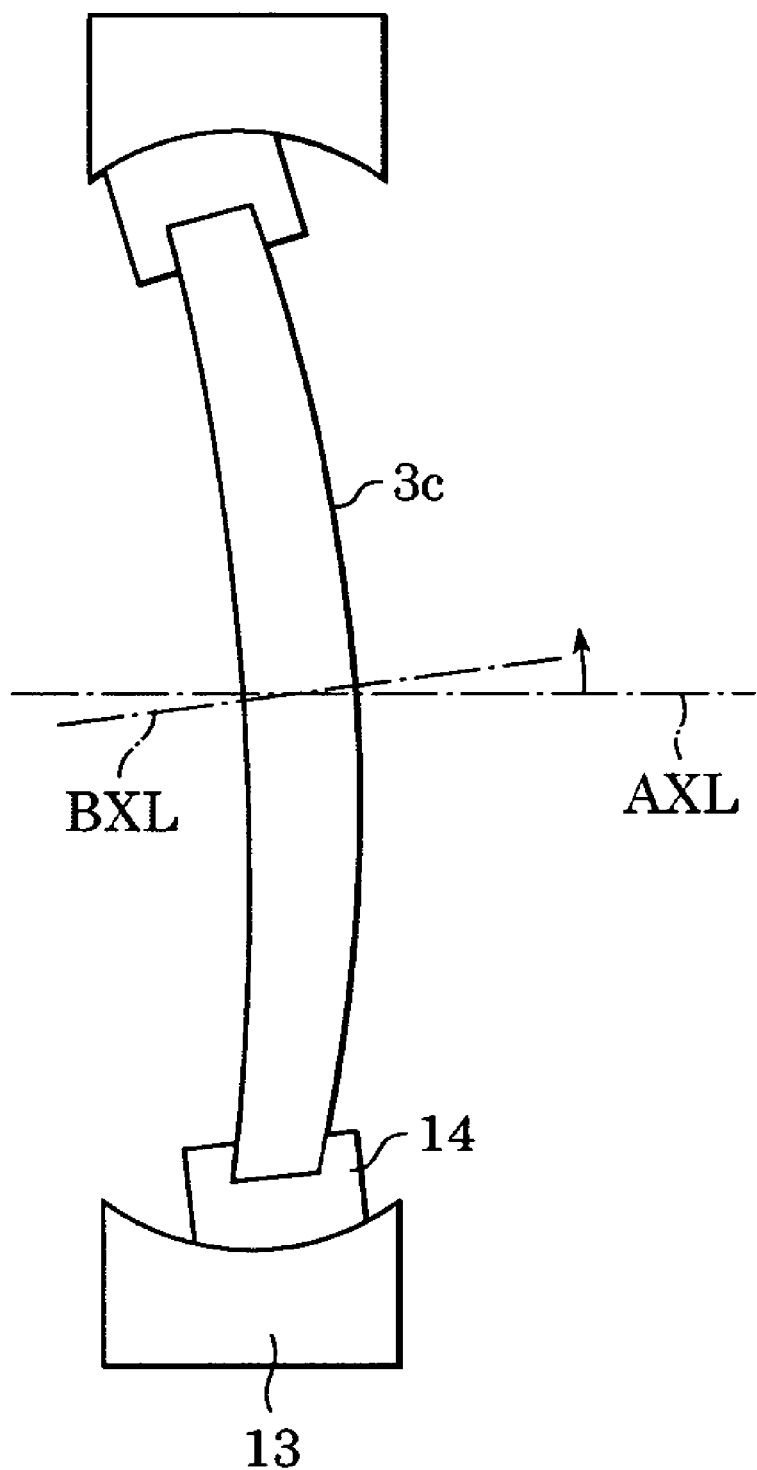
FIG. 23B is another schematic diagram showing an eccentricity adjustment mechanism according to the first to fifth embodiments.

In FIG. 23B, reference numeral 13 denotes the main body of the zoom lens and reference numeral 14 denotes a lens frame which has a convex outer surface and which retains the lens sub-unit 3c. An inner surface of the main body 13 of the zoom lens is concave and is curved with the same radius of curvature as that of the outer surface of the lens frame 14. Accordingly, the amount of oblique eccentricity of an optical axis BXL of the lens sub-unit 3c with respect to an optical axis AXL of the zoom lens can be adjusted by moving the lens frame 14 along the concave inner surface of the main body 13 of the zoom lens.

FIGS. 23A and 23B simply show examples of adjustment mechanisms, and other adjustment mechanisms may also be used. Alternatively, an adjustment mechanism which can adjust both the amount of parallel eccentricity and the amount of oblique eccentricity of the lens sub-unit 3c may also be provided by combining the adjustment mechanisms shown in FIGS. 23A and 23B.

In the embodiments, the amount of parallel eccentricity allowed to the lens sub-unit 3c is about 1 mm at a maximum, and the amount of oblique eccentricity allowed to the lens sub-unit 3c is about 1° at a maximum.

In addition, in the embodiments, an adjustment mechanism for correcting the spherical aberration at the wide-angle end by adjusting the position of the fixed lens sub-unit 3a along the optical axis may also be provided. Different from the correction of eccentric aberration, which is performed relatively frequently, it is not necessary to correct the spherical aberration repeatedly since the spherical aberration can be predicted in advance from the errors in lens thicknesses, air gaps, curvatures, etc., generated in the manufacturing process. Therefore, the adjustability in the state in which the above-mentioned drive unit is attached is not very important.

According to the embodiments, in the state in which the lens sub-unit 3b is positioned such that an object at infinity is in focus, when the focal length of the zoom lens at the wide-angle end is standardized to 1 and paraxial tracing is performed, the following expression is preferably satisfied:

$$|\alpha_{p3b} \cdot \phi_{3b} \cdot (sk \cdot \phi_{3c} - 1) \cdot x \cdot (x+\delta)/b^2| < 2.0 \times 10^{-4} \quad (5)$$

where, $\alpha_{p3b}$: converted inclination angle of incidence of an off-axis principal light ray on the lens sub-unit 3b, $\phi_{3b}$: refractive power of the lens sub-unit 3b, $\phi_{3c}$: refractive power of the lens sub-unit 3c, sk: distance from the principal point of the lens sub-unit 3c to the image plane, x: amount of movement of the lens sub-unit $3b$ between a position where it focuses on an object at infinity and a position where it focuses on an object at the closest distance at the telephoto end, δ: difference between a distance from the principal point of the lens sub-unit $3b$ to a virtual image of the diaphragm SP and a distance from the principal point of the lens sub-unit $3b$ to a virtual image of the imaging position, and b: magnification of the zoom lens.

Figure 21:
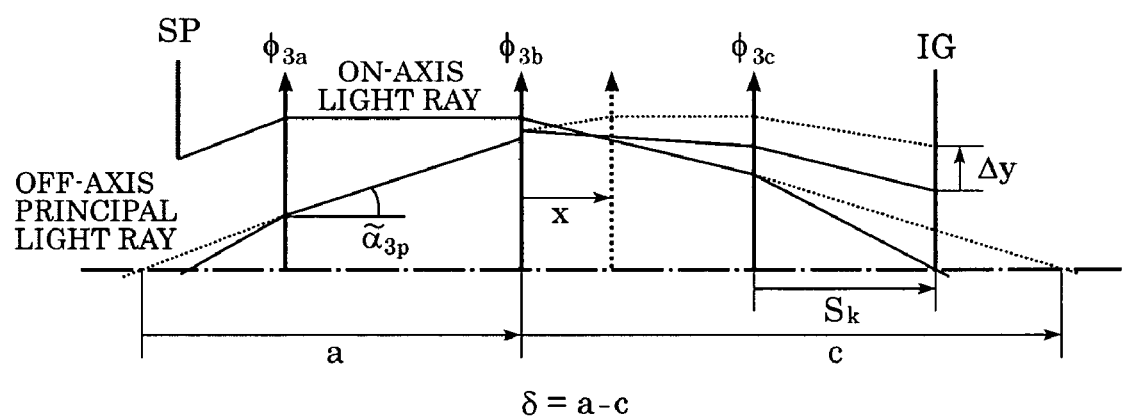
FIG. 21 is a schematic diagram showing the relationship between the refractive power arrangement in a paraxial area and the change in a field of view due to a focal-point adjustment operation.

The relationship between the refractive power arrangement in a paraxial area and the change in a field of view (that is, the change in an imaging magnification) due to the focal-point adjustment operation will be described below with reference to FIG. 21. FIG. 21 is a schematic diagram showing the optical operation in the imaging lens unit arranged nearer to the image plane than the diaphragm SP. The off-axis principal light ray which passes through the diaphragm SP reaches an image plane IG via the lens sub-unit $3a$, the lens sub-unit $3b$, and the lens sub-unit $3c$. Here, a change Δy in the field of view corresponding to the off-axis principal light ray on the image plane IG when the lens sub-unit $3b$ moves for the focal point adjustment will be considered.

The change Δy in the field of view due to the focal point adjustment is generally expressed as follows:

$$\Delta y \propto \alpha_{p3b} \cdot \phi_{3b} \cdot (sk \cdot \phi_{3c} - 1) \cdot x \cdot (x + \delta) \quad (6)$$

where, $\alpha_{p3b}$: angle of incidence of the off-axis principal light ray on the lens sub-unit $3b$, $\phi_{3b}$: refractive power of the lens sub-unit $3b$, $\phi_{3c}$: refractive power of the lens sub-unit $3c$, sk: distance between the lens sub-unit $3c$ and the image plane IG, δ: difference between a distance a from the principal point of the lens sub-unit $3b$ to the virtual image of the diaphragm SP and a distance c from the principal point of the lens sub-unit $3b$ to the virtual image of the imaging position, and x: amount of movement of the lens sub-unit $3b$ between a position where it focuses on an object at infinity and a position where it focuses on an object at the closest distance possible at the telephoto end.

Since the amount of movement x in the focal point adjustment is generally proportional to the square of the focal length, the amount of movement of the lens sub-unit $3b$ in the focal point adjustment becomes the largest at the telephoto end. In the embodiments, since the focal length at the wide-angle end is standardized to 1, when b is the variable power ratio, the standardized amount of change in the field of view is generally expressed as follows:

$$\frac{\Delta y}{b^2} \propto \alpha_{p3b} \cdot \phi_{3b} \cdot (sk \cdot \phi_{3c} - 1) \cdot x \cdot (x + \delta) / b^2 \quad (7)$$

When the refractive power of the lens sub-unit $3b$ is increased and the upper limit in Expression (5) is exceeded, the curvature of each lens element included in the lens sub-unit $3b$ is also increased. Accordingly, the weight of the lens sub-unit $3b$ and the aberrations are increased, and variations in the aberrations during the focal point adjustment are also increased. In addition, the field of view largely varies during the focal point adjustment, and the appearance of a picture shot with the zoom lens is degraded.

In addition, as described above, the second lens unit II includes the lens sub-unit $2a$ which has a negative refractive power and which moves for varying the magnification and the lens sub-unit $2b$ which also has a negative refractive power and which moves for correcting the imaging position (image plane) which moves when the lens sub-unit $2a$ moves. Accordingly, variations in the aberrations are suppressed during the variation of magnification and excellent optical performance can be obtained. In addition, a gap to be provided for driving the lens sub-unit $3b$ is reduced, and accordingly the size and weight of the zoom lens are reduced.

Numerical examples corresponding to embodiments shown in FIGS. 1 to 5 are shown in Tables 1 to 5, respectively. In each table, f is the focal length of the overall zoom lens, fno is the F-number, ω (shown as w in each table) is the half field angle, ri is the radius of curvature of the $i^{th}$ lens surface from the object, di is the distance between the $i^{th}$ and $(i+1)^{th}$ lens surfaces, and ni and vi (shown as vi in each table) are the refractive index and the Abbe number, respectively, of the material of the $i^{th}$ lens element from the object. In the each table, ri=0.000 represents ri=∞.

FIGS. 6 to 20C show aberration diagrams according to the above-described numerical examples. FIGS. 6, 9, 12, 15, and 18 show aberration diagrams according to numerical examples 1 to 5, respectively, obtained at the wide-angle end (f=1 mm) when the object distance is 0.3 m. FIGS. 7, 10, 13, 16, and 19 show aberration diagrams according to numerical examples 1 to 5, respectively, obtained at the middle zoom position (f=3.25 mm) when the object distance is 0.3 m. FIGS. 8A, 11A, 14A, 17A, and 20A show aberration diagrams according to numerical examples 1 to 5, respectively, obtained at the telephoto end (f=12.6 mm) when the object distance is 0.3 m. FIG. 8B, 11B, 14B, 17B, and 20B show aberration diagrams according to numerical examples 1 to 5, respectively, obtained at the telephoto end (f=12.6 mm) when the object distance is infinite. FIG. 8C, 11C, 14C, 17C, and 20C show aberration diagrams according to numerical examples 1 to 5, respectively, obtained at the telephoto end (f=12.6 mm) when the object distance is 0.11 m.

In each aberration diagram, the solid line shows the e-line, the dashed line shows the F-line, the one-dot chain line shows the C-line, and the two-dot chain line shows the g-line.

In addition, in each aberration diagram, "sph" represents spherical aberration, "as" represents astigmatism, "dist" represents distortion, and "chro" represents lateral chromatic aberration.

TABLE 1

Numerical Example 1
f = 1.00000 fno = 1:1.85 2w = 66.1~5.4~1.94

| | | | |
|---|---|---|---|
| r1 = 56.805 | d1 = 0.24 | n1 = 1.81265 | v1 = 25.4 |
| r2 = 9.400 | d2 = 1.22 | n2 = 1.48915 | v2 = 70.2 |
| r3 = −46.355 | d3 = 0.69 | | |
| r4 = 11.809 | d4 = 0.94 | n3 = 1.62287 | v3 = 60.3 |
| r5 = −38.196 | d5 = 0.02 | | |
| r6 = 5.792 | d6 = 0.71 | n4 = 1.65425 | v4 = 58.5 |
| r7 = 13.718 | d7 = variable | | |
| r8 = 12.305 | d8 = 0.11 | n5 = 1.88814 | v5 = 40.8 |
| r9 = 2.160 | d9 = 0.36 | | |
| r10 = 12.728 | d10 = 0.09 | n6 = 1.80811 | v6 = 46.6 |
| r11 = 4.616 | d11 = 0.49 | | |
| r12 = −2.008 | d12 = 0.09 | n7 = 1.77621 | v7 = 49.6 |
| r13 = 5.476 | d13 = 0.34 | n8 = 1.93306 | v8 = 21.3 |
| r14 = −5.070 | d14 = variable | | |
| r15 = −2.817 | d15 = 0.10 | n9 = 1.77621 | v9 = 49.6 |
| r16 = 3.149 | d16 = 0.40 | n10 = 1.81265 | v10 = 25.4 |
| r17 = −84.530 | d17 = variable | | |
| r18 = 0.000 (diaphragm) | d18 = 0.24 | | |
| r19 = −32.761 | d19 = 0.49 | n11 = 1.60891 | v11 = 43.7 |
| r20 = −2.554 | d20 = 0.02 | | |
| r21 = 5.672 | d21 = 0.70 | n12 = 1.48915 | v12 = 70.2 |
| r22 = −2.343 | d22 = 0.13 | n13 = 1.88815 | v13 = 40.8 |
| r23 = 27.414 | d23 = 0.03 | | |
| r24 = 4.319 | d24 = 0.44 | n14 = 1.51976 | v14 = 52.4 |
| r25 = −11.904 | d25 = 4.02 | | |
| r26 = 9.103 | d26 = 0.11 | n15 = 1.85482 | v15 = 23.9 |

TABLE 1-continued

Numerical Example 1
f = 1.00000 fno = 1:1.85 2w = 66.1~5.4~1.94

| | | | |
|---|---|---|---|
| r27 = 3.780 | d27 = 0.23 | | |
| r28 = 12.185 | d28 = 0.39 | n16 = 1.49845 | v16 = 81.5 |
| r29 = −4.945 | d29 = 0.02 | | |
| r30 = 2.936 | d30 = 0.79 | n17 = 1.48915 | v17 = 70.2 |
| r31 = 117.484 | d31 = 0.18 | | |
| r32 = −16.089 | d32 = 0.26 | n18 = 1.48915 | v18 = 70.2 |
| r33 = −9.986 | d33 = 0.54 | | |
| r34 = 0.000 | d34 = 3.23 | n19 = 1.60718 | v19 = 38.0 |
| r35 = 0.000 | d35 = 1.74 | n20 = 1.51825 | v20 = 64.2 |
| r36 = 0.000 | | | |

| | Focal Length Variable Range | | |
|---|---|---|---|
| | 1.00 | 3.25 | 12.60 |
| d7 | 0.07 | 3.17 | 4.92 |
| d14 | 4.95 | 1.41 | 0.16 |
| d17 | 0.22 | 0.65 | 0.15 |

TABLE 2

Numerical Example 2
f = 1.00000 fno = 1:1.85 2w = 66.1~5.4~1.94

| | | | |
|---|---|---|---|
| r1 = 56.805 | d1 = 0.24 | n1 = 1.76859 | v1 = 26.5 |
| r2 = 9.400 | d2 = 1.22 | n2 = 1.48915 | v2 = 70.2 |
| r3 = −46.355 | d3 = 0.69 | | |
| r4 = 11.809 | d4 = 0.94 | n3 = 1.62287 | v3 = 60.3 |
| r5 = −46.632 | d5 = 0.02 | | |
| r6 = 5.792 | d6 = 0.71 | n4 = 1.65425 | v4 = 58.5 |
| r7 = 13.718 | d7 = variable | | |
| r8 = 12.305 | d8 = 0.11 | n5 = 1.88814 | v5 = 40.8 |
| r9 = 2.160 | d9 = 0.36 | | |
| r10 = 12.728 | d10 = 0.09 | n6 = 1.80811 | v6 = 46.6 |
| r11 = 4.616 | d11 = 0.49 | | |
| r12 = −2.008 | d12 = 0.09 | n7 = 1.77621 | v7 = 49.6 |
| r13 = 5.476 | d13 = 0.34 | n8 = 1.93306 | v8 = 21.3 |
| r14 = −5.070 | d14 = variable | | |
| r15 = −2.817 | d15 = 0.10 | n9 = 1.77621 | v9 = 49.6 |
| r16 = 3.149 | d16 = 0.40 | n10 = 1.81265 | v10 = 25.4 |
| r17 = −84.530 | d17 = variable | | |
| r18 = 0.000 (diaphragm) | d18 = 0.30 | | |
| r19 = −15.978 | d19 = 0.33 | n11 = 1.60718 | v11 = 38.0 |
| r20 = −3.874 | d20 = 0.02 | | |
| r21 = 7.271 | d21 = 0.13 | n12 = 1.88815 | v12 = 40.8 |
| r22 = 3.922 | d22 = 0.61 | n13 = 1.48915 | v13 = 70.2 |
| r23 = −7.297 | d23 = 0.04 | | |
| r24 = 6.591 | d24 = 0.74 | n14 = 1.48915 | v14 = 70.2 |
| r25 = −2.556 | d25 = 0.13 | n15 = 1.88815 | v15 = 40.8 |
| r26 = 44.549 | d26 = 0.03 | | |
| r27 = 8.397 | d27 = 0.60 | n16 = 1.57047 | v16 = 42.8 |
| r28 = −3.868 | d28 = 2.76 | | |
| r29 = 27.097 | d29 = 0.11 | n17 = 1.85482 | v17 = 23.9 |
| r30 = 4.091 | d30 = 0.38 | | |
| r31 = −10.246 | d31 = 0.31 | n18 = 1.48915 | v18 = 70.2 |
| r32 = −4.059 | d32 = 0.02 | | |
| r33 = 3.677 | d33 = 0.45 | n19 = 1.48915 | v19 = 70.2 |
| r34 = −11.096 | d34 = 0.18 | | |
| r35 = 4.620 | d35 = 0.20 | n20 = 1.51825 | v20 = 64.1 |
| r36 = 9.914 | d36 = 0.54 | | |
| r37 = 0.000 | d37 = 3.23 | n21 = 1.60718 | v21 = 38.0 |
| r38 = 0.000 | d38 = 1.74 | n22 = 1.51825 | v22 = 64.2 |
| r39 = 0.000 | | | |

| | Focal Length Variable Range | | |
|---|---|---|---|
| | 1.00 | 3.25 | 12.60 |
| d7 | 0.01 | 3.11 | 4.86 |
| d14 | 4.95 | 1.41 | 0.16 |
| d17 | 0.22 | 0.65 | 0.15 |

TABLE 3

Numerical Example 3
f = 1.00000 fno = 1:1.85 2w = 61.1~5.4~1.94

| | | | |
|---|---|---|---|
| r1 = 56.805 | d1 = 0.24 | n1 = 1.81265 | v1 = 25.4 |
| r2 = 9.400 | d2 = 1.22 | n2 = 1.48915 | v2 = 70.2 |
| r3 = −46.355 | d3 = 0.69 | | v3 = 60.3 |
| r4 = 11.809 | d4 = 0.94 | n3 = 1.62287 | |
| r5 = −38.196 | d5 = 0.02 | | |
| r6 = 5.792 | d6 = 0.71 | n4 = 1.65425 | v4 = 58.5 |
| r7 = 13.718 | d7 = variable | | |
| r8 = 12.305 | d8 = 0.11 | n5 = 1.88814 | v5 = 40.8 |
| r9 = 2.160 | d9 = 0.36 | | |
| r10 = 12.728 | d10 = 0.09 | n6 = 1.80811 | v6 = 46.6 |
| r11 = 4.616 | d11 = 0.49 | | |
| r12 = −2.008 | d12 = 0.09 | n7 = 1.77621 | v7 = 49.6 |
| r13 = 5.476 | d13 = 0.34 | n8 = 1.93306 | v8 = 21.3 |
| r14 = −5.070 | d14 = variable | n9 = 1.77621 | v9 = 49.6 |
| r15 = −2.817 | d15 = 0.10 | | |
| r16 = 3.149 | d16 = 0.40 | n10 = 1.81265 | v10 = 25.4 |
| r17 = −84.530 | d17 = variable | | |
| r18 = 0.000 (diaphragm) | d18 = 0.24 | | |
| r19 = −18.151 | d19 = 0.34 | n11 = 1.60718 | v11 = 38.0 |
| r20 = −4.270 | d20 = 0.02 | | |
| r21 = 7.126 | d21 = 0.13 | n12 = 1.88815 | v12 = 40.8 |
| r22 = 3.184 | d22 = 0.59 | n13 = 1.51825 | v13 = 64.1 |
| r23 = −4.897 | d23 = 0.04 | | |
| r24 = 7.033 | d24 = 0.86 | n14 = 1.48915 | v14 = 70.2 |
| r25 = −2.855 | d25 = 0.13 | n15 = 1.88815 | v15 = 40.8 |
| r26 = 8.191 | d26 = 0.03 | | |
| r27 = 5.756 | d27 = 0.75 | n16 = 1.57047 | v16 = 42.8 |
| r28 = −3.694 | d28 = 3.76 | | |
| r29 = 5.991 | d29 = 0.11 | n17 = 1.85482 | v17 = 23.9 |
| r30 = 3.044 | d30 = 0.60 | | |
| r31 = 3.820 | d31 = 0.54 | n18 = 1.49845 | v18 = 81.5 |
| r32 = −5.576 | d32 = 0.18 | | |
| r33 = 6.574 | d33 = 0.32 | n19 = 1.48915 | v19 = 70.2 |
| r34 = −107.664 | d34 = 0.54 | | |
| r35 = 0.000 | d35 = 3.23 | n20 = 1.60718 | v20 = 38.0 |
| r36 = 0.000 | d36 = 1.74 | n21 = 1.51825 | v21 = 64.2 |
| r37 = 0.000 | | | |

| | Focal Length Variable Range | | |
|---|---|---|---|
| | 1.00 | 3.25 | 12.60 |
| d7 | 0.07 | 3.17 | 4.92 |
| d14 | 4.95 | 1.41 | 0.16 |
| d17 | 0.22 | 0.65 | 0.15 |

TABLE 4

Numerical Example 4
f = 1.00000 fno = 1:1.85 2w = 61.1~5.4~1.94

| | | | |
|---|---|---|---|
| r1 = 56.805 | d1 = 0.24 | n1 = 1.81265 | v1 = 25.4 |
| r2 = 9.400 | d2 = 1.22 | n2 = 1.48915 | v2 = 70.2 |
| r3 = −46.355 | d3 = 0.69 | | |
| r4 = 11.809 | d4 = 0.94 | n3 = 1.62287 | v3 = 60.3 |
| r5 = −38.196 | d5 = 0.02 | | |
| r6 = 5.792 | d6 = 0.71 | n4 = 1.65425 | v4 = 58.5 |
| r7 = 13.718 | d7 = variable | | |
| r8 = 12.305 | d8 = 0.11 | n5 = 1.88814 | v5 = 40.8 |
| r9 = 2.160 | d9 = 0.36 | | |
| r10 = 12.728 | d10 = 0.09 | n6 = 1.80811 | v6 = 46.6 |
| r11 = 4.616 | d11 = 0.49 | | |
| r12 = −2.008 | d12 = 0.09 | n7 = 1.77621 | v7 = 49.6 |
| r13 = 5.476 | d13 = 0.34 | n8 = 1.93306 | v8 = 21.3 |
| r14 = −5.070 | d14 = variable | | |
| r15 = −2.817 | d15 = 0.10 | n9 = 1.77621 | v9 = 49.6 |
| r16 = 3.149 | d16 = 0.40 | n10 = 1.81265 | v10 = 25.4 |
| r17 = −84.530 | d17 = variable | | |
| r18 = 0.000 (diaphragm) | d18 = 0.25 | | |

TABLE 4-continued

Numerical Example 4
f = 1.00000 fno = 1:1.85 2w = 61.1~5.4~1.94

| | | | |
|---|---|---|---|
| r19 = −54.202 | d19 = 0.33 | n11 = 1.60718 | v11 = 38.0 |
| r20 = −3.705 | d20 = 0.02 | | |
| r21 = 8.751 | d21 = 0.57 | n12 = 1.48915 | v12 = 70.2 |
| r22 = −2.991 | d22 = 0.07 | n13 = 1.88815 | v13 = 40.8 |
| r23 = −5.038 | d23 = 0.04 | | |
| r24 = 7.265 | d24 = 0.66 | n14 = 1.48915 | v14 = 70.2 |
| r25 = −3.271 | d25 = 0.13 | n15 = 1.88815 | v15 = 40.8 |
| r26 = 7.319 | d26 = 0.03 | | |
| r27 = 5.219 | d27 = 0.53 | n16 = 1.57047 | v16 = 42.8 |
| r28 = −5.154 | d28 = 2.78 | | |
| r29 = 10.220 | d29 = 0.11 | n17 = 1.85482 | v17 = 23.9 |
| r30 = 3.602 | d30 = 0.22 | | |
| r31 = 20.465 | d31 = 0.32 | n18 = 1.48915 | v18 = 70.2 |
| r32 = −5.733 | d32 = 0.02 | | |
| r33 = 3.147 | d33 = 0.54 | n19 = 1.48915 | v19 = 70.2 |
| r34 = −10.272 | d34 = 0.18 | | |
| r35 = 3902.495 | d35 = 0.19 | n20 = 1.51825 | v20 = 64.1 |
| r36 = −29.845 | d36 = 0.54 | | |
| r37 = 0.000 | d37 = 3.23 | n21 = 1.60718 | v21 = 38.0 |
| r38 = 0.000 | d38 = 1.74 | n22 = 1.51825 | v22 = 64.2 |
| r39 = 0.000 | | | |

| | Focal Length Variable Range | | |
|---|---|---|---|
| | 1.00 | 3.25 | 12.60 |
| d7 | 0.07 | 3.17 | 4.92 |
| d14 | 4.95 | 1.41 | 0.16 |
| d17 | 0.22 | 0.65 | 0.15 |

TABLE 5

Numerical Example 5
f = 1.00000 fno = 1:1.85 2w = 61.1~1.94~5.4

| | | | |
|---|---|---|---|
| r1 = 56.805 | d1 = 0.24 | n1 = 1.81265 | v1 = 25.4 |
| r2 = 9.400 | d2 = 1.22 | n2 = 1.48915 | v2 = 70.2 |
| r3 = −46.355 | d3 = 0.69 | | |
| r4 = 11.809 | d4 = 0.94 | n3 = 1.62287 | v3 = 60.3 |
| r5 = −38.196 | d5 = 0.02 | | |
| r6 = 5.792 | d6 = 0.71 | n4 = 1.65425 | v4 = 58.5 |
| r7 = 13.718 | d7 = variable | | |
| r8 = 12.305 | d8 = 0.11 | n5 = 1.88814 | v5 = 40.8 |
| r9 = 2.160 | d9 = 0.36 | | |
| r10 = 12.728 | d10 = 0.09 | n6 = 1.80811 | v6 = 46.6 |
| r11 = 4.616 | d11 = 0.49 | n7 = 1.77621 | v7 = 49.6 |
| r12 = −2.008 | d12 = 0.09 | | |
| r13 = 5.476 | d13 = 0.34 | n8 = 1.93306 | v8 = 21.3 |
| r14 = −5.070 | d14 = variable | | |

TABLE 5-continued

Numerical Example 5
f = 1.00000 fno = 1:1.85 2w = 61.1~1.94~5.4

| | | | |
|---|---|---|---|
| r15 = −2.817 | d15 = 0.10 | n9 = 1.77621 | v9 = 49.6 |
| r16 = 3.149 | d16 = 0.40 | n10 = 1.81265 | v10 = 25.4 |
| r17 = −84.530 | d17 = variable | | |
| r18 = 0.000 (diaphragm) | d18 = 0.24 | | |
| r19 = −5.156 | d19 = 0.31 | n11 = 1.65425 | v11 = 58.5 |
| r20 = −3.057 | d20 = 0.02 | | |
| r21 = 6.708 | d21 = 0.46 | n12 = 1.62286 | v12 = 60.3 |
| r22 = −6.795 | d22 = 0.02 | | |
| r23 = 8.906 | d23 = 0.65 | n13 = 1.48915 | v13 = 70.2 |
| r24 = −3.496 | d24 = 0.13 | n14 = 1.83932 | v14 = 37.2 |
| r25 = −19.744 | d25 = 4.30 | | |
| r26 = 16.245 | d26 = 0.11 | n15 = 1.85482 | v15 = 23.9 |
| r27 = 4.737 | d27 = 0.21 | | |
| r28 = 6.861 | d28 = 0.53 | n16 = 1.49845 | v16 = 81.5 |
| r29 = −6.295 | d29 = 0 02 | | |
| r30 = 4.326 | d30 = 0.53 | n17 = 1.48915 | v17 = 70.2 |
| r31 = −22.070 | d31 = 0.18 | | |
| r32 = 12.441 | d32 = 0.23 | n18 = 1.48915 | v18 = 70.2 |
| r33 = −569.799 | d33 = 0.54 | | |
| r34 = 0.000 | d34 = 3.23 | n19 = 1.60718 | v19 = 38.0 |
| r35 = 0.000 | d35 = 1.74 | n20 = 1.51825 | v20 = 64.2 |
| r36 = 0.000 | | | |

| | Focal Length Variable Range | | |
|---|---|---|---|
| | 1.00 | 3.25 | 12.60 |
| d7 | 0.07 | 3.17 | 4.92 |
| d14 | 4.95 | 1.41 | 0.16 |
| d17 | 0.22 | 0.65 | 0.15 |

As is clear from above, according to the above-described embodiments, rear-focus zoom lenses having high aperture ratios with the F-number of about 2.0 and high variable power ratios of 10 or more are obtained.

The relationship between the above-described numerical examples, Expressions (1) to (4), and the change percentage in the field of view at the telephoto end is shown in Table 6. The lens sub-unit 3b is a rear focus lens unit having a positive refractive power as a whole, and moves along the optical axis toward the object side when an object at a close distance is to be focused on. Here, the closest distance which the zoom lenses can focus on is set to 110 mm from the lens surface nearest to the object.

TABLE 6

Conditional expressions and the change percentage in the field of view in each numerical example (focal length at the wide-angle end is standardized to 1).

| | Numerical Example 1 | Numerical Example 2 | Numerical Example 3 | Numerical Example 4 | Numerical Example 5 |
|---|---|---|---|---|---|
| Expression (1) | 0.005 | 0.326 | 0.224 | 0.126 | 0.037 |
| Expression (2) | 0.101 | 0.591 | 0.789 | 0.100 | 0.237 |
| Expression (3) | 0.187 | 0.103 | 0.100 | 0.175 | 0.170 |
| Expression (4) | $0.415 \times 10^{-4}$ | $0.430 \times 10^{-4}$ | $1.557 \times 10^{-4}$ | $0.718 \times 10^{-4}$ | $1.770 \times 10^{-4}$ |
| Change in Field of View | 0.7% | 0.7% | 2.5% | 1.1% | 2.8% |

Characteristics of the third lens unit III in each embodiment (numerical example) will be additionally explained below.

Regarding First Embodiment

In the first embodiment (numerical example 1) shown in FIG. 1, the value of Expression (1) is close to the lower limit. Accordingly, the refractive power of the lens sub-unit 3a is low, and the lens sub-unit 3a includes a relatively small number of lens elements, more specifically, four lens elements consisting of positive, positive, negative, and positive lens elements in that order from the object side.

In addition, the value of Expression (3) is close to the upper limit. Accordingly, the refractive power of the lens sub-unit 3b is high, and the lens sub-unit 3b includes three lens elements consisting of negative, positive, and positive lens elements in that order from the object side. Since the lens element positioned nearest to the object side is a negative lens element, the incidence height of the on-axis light ray on the negative lens element is increased. Accordingly, the chromatic aberration is corrected and the other aberrations are reduced with a low refractive power, and the weight of the lens sub-unit 3b is reduced.

In addition, the refractive powers of the lens sub-units 3b and 3c are adequately set in accordance with Expressions (2) and (4), and therefore the weight of the lens sub-unit 3b can be further reduced and the lens sub-unit 3c provides adequate sensitivity as an eccentric aberration adjustment unit. In addition, the change percentage in the field of view is low and excellent optical performance is provided.

Regarding Second Embodiment

In the second embodiment (numerical example 2) shown in FIG. 2, the value of Expression (1) is close to the upper limit. Accordingly, the refractive power of the lens sub-unit 3a is high, and the lens sub-unit 3a includes six lens elements consisting of positive, negative, positive, positive, negative, and positive lens elements in that order from the object side. Therefore, the on-axis chromatic aberration and the spherical aberration can be effectively reduced.

The spherical aberration at the wide-angle end may also be corrected by varying the gap corresponding to d26 in Table 2 in the lens sub-unit 3a.

The lens sub-unit 3b includes three lens elements consisting of negative, positive, and positive lens elements in that order from the object side. Since the lens element positioned nearest to the object side is a negative lens element, the chromatic aberration is corrected and the other aberrations are reduced with a low refractive power. In addition, the weight of the lens sub-unit 3b is reduced.

In addition, the refractive powers of the lens sub-units 3b and 3c are adequately set in accordance with Expressions (2) and (4), and therefore the weight of the lens sub-unit 3b can be further reduced and the lens sub-unit 3c provides adequate sensitivity as an eccentric aberration adjustment unit. In addition, the change percentage in the field of view is low and excellent optical performance is provided.

Regarding Third Embodiment

In the third embodiment (numerical example 3) shown in FIG. 3, the lens sub-unit 3a includes six lens elements consisting of positive, negative, positive, positive, negative, and positive lens elements in that order from the object side. Accordingly, the on-axis chromatic aberration and the spherical aberration can be effectively reduced.

The spherical aberration at the wide-angle end may also be corrected by varying the gap corresponding to d26 in Table 3 in the lens sub-unit 3a.

In addition, the value of Expression (3) is close to the lower limit. Accordingly, the refractive power of the lens sub-unit 3b is low, and the lens sub-unit 3b includes a relatively small number of lens elements, more specifically, two lens elements consisting of negative and positive lens elements in that order from the object side.

In addition, the refractive powers of the lens sub-units 3b and 3c are adequately set in accordance with Expressions (2) and (4), and therefore the weight of the lens sub-unit 3b can be further reduced and the lens sub-unit 3c provides adequate sensitivity as an eccentric aberration adjustment unit. In addition, the change percentage in the field of view is low and excellent optical performance is provided.

Regarding Fourth Embodiment

In the fourth embodiment (numerical example 4) shown in FIG. 4, the lens sub-unit 3a includes six lens elements consisting of positive, positive, negative, positive, negative, and positive lens elements in that order from the object side. Accordingly, the on-axis chromatic aberration and the spherical aberration can be effectively reduced.

The spherical aberration at the wide-angle end may also be corrected by varying the gap corresponding to d26 in Table 4 in the lens sub-unit 3a.

The lens sub-unit 3b includes three lens elements consisting of negative, positive, and positive lens elements in that order from the object side. Since the lens element positioned nearest to the object side is a negative lens element, the chromatic aberration is corrected and the other aberrations are reduced with a low refractive power. In addition, the weight of the lens sub-unit 3b is reduced.

In addition, the refractive powers of the lens sub-units 3b and 3c are adequately set in accordance with Expressions (2) and (4), and therefore the weight of the lens sub-unit 3b can be further reduced and the lens sub-unit 3c provides adequate sensitivity as an eccentric aberration adjustment unit. In addition, the change percentage in the field of view is low and excellent optical performance is provided.

Regarding Fifth Embodiment

In the fifth embodiment (numerical example 5) shown in FIG. 5, the lens sub-unit 3a includes four lens elements consisting of positive, positive, positive, and negative lens elements in that order from the object side.

The lens sub-unit 3b includes three lens elements consisting of negative, positive, and positive lens elements in that order from the object side. Since the lens element positioned nearest to the object side is a negative lens element, the chromatic aberration is corrected and the other aberrations are reduced with a low refractive power. In addition, the weight of the lens sub-unit 3b is reduced.

In addition, the refractive powers of the lens sub-units 3b and 3c are adequately set in accordance with Expressions (2) and (4), and therefore the weight of the lens sub-unit 3b can be further reduced and the lens sub-unit 3c provides adequate sensitivity as an eccentric aberration adjustment unit. In addition, the change percentage in the field of view is low and excellent optical performance is provided.

As described above, according to the above-described embodiments, the third lens unit III for imaging which is positioned closer to the image plane than the diaphragm SP includes the fixed lens sub-unit 3a, the lens sub-unit 3b which functions as a focus lens unit, and the lens sub-unit 3c for correcting the eccentric aberration at the wide-angle end. By suitably setting the refractive powers of the lens sub-units 3a to 3c, sensitivity to back focus of the lens sub-unit 3b is ensured and the weight is reduced at the same time. Accordingly, the focal point adjustment is performed with a small driving force and a small amount of movement. In addition, the required back focus is ensured and variations in the aberrations and the field of view during the focal point adjustment are reduced. Accordingly, excellent optical performance is provided with a simple structure.

The zoom lenses according to the above-described embodiments are attached to shooting apparatuses, such as television cameras and video cameras, in such a manner that they are replaceable with other lenses. A shooting system (television camera system) using the zoom lens according to the above-described embodiments as a shooting optical system will be described below with reference to FIG. 22.

Figure 22:
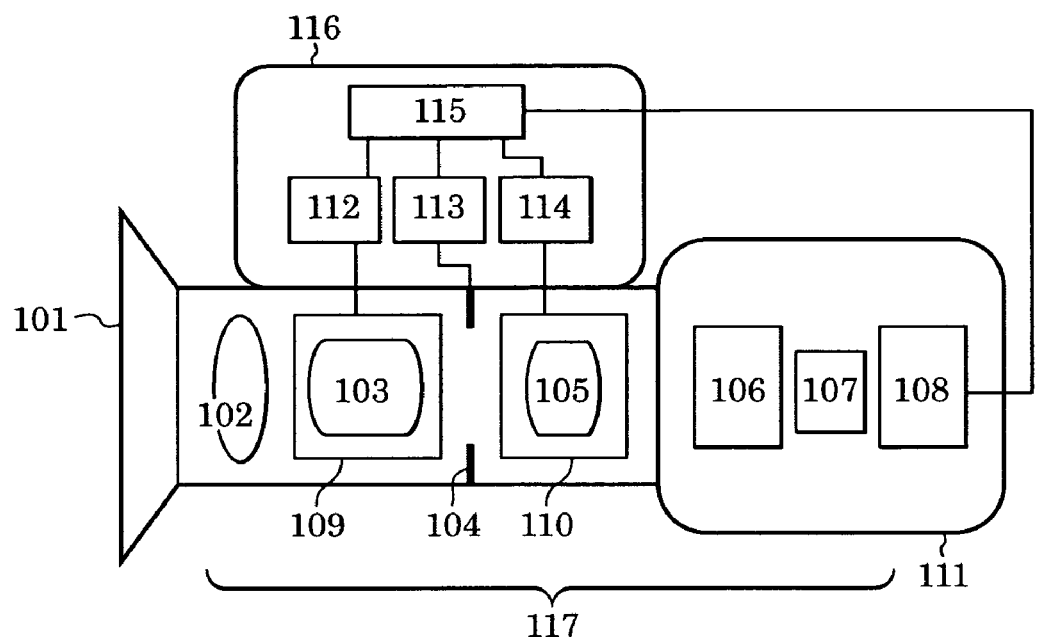
FIG. 22 is a schematic diagram showing a shooting system including a zoom lens according to the first to fifth embodiments.

With reference to FIG. 22, a shooting system 117 includes a zoom lens 101 according to the above-described embodiments and a camera 111 which functions as a shooting apparatus and to which the zoom lens 101 is attached.

The zoom lens 101 includes a fixed front lens unit 102 (first lens unit I), a lens unit 103 (second lens unit II) including a variator lens sub-unit which moves along an optical axis for varying the magnification and a compensator lens sub-unit which moves along the optical axis for correcting a displacement of an image plane during the variation of magnification, a diaphragm 104, a focus lens unit 105 (third lens unit III) which moves along the optical axis for focusing.

In addition, the shooting system 117 further includes a zoom mechanism 109 including a cam or the like with which a manual zoom operation is performed by mechanically controlling the position of the lens unit 103 along the optical axis during the variation of magnification and a focusing mechanism 110 including a feed screw or the like with which the focus lens unit 105 is driven along the optical axis.

The camera 111 includes a glass block 106 which corresponds to an optical filter or a color separation prism, an imaging device (photoelectric converter) 107, such as a CCD sensor and a CMOS sensor, which receives an object image formed by the zoom lens 101, and a camera controller 108, such as a CPU, which controls the camera 111.

In addition, the shooting system 117 further includes a drive unit 116 attached on a side of the zoom lens 101. The drive unit 116 is provided with various operation switches including a zoom switch, an auto focus/manual focus switch, and a diaphragm switch, and serves as an interface between the zoom lens 101 and the camera operator. The drive unit 116 includes a zoom actuator 112 which drives the zoom mechanism 109 and moves the lens unit 103 to vary the magnification, an actuator 113 which drives the diaphragm 104, a focus actuator 114, such as a stepper motor, which electrically drives the focus lens unit 105, and a drive-unit controller 115, such as a CPU, which controls the drive unit 116.

Although the drive unit 116 is externally attached to the zoom lens 101 in FIG. 22, the present invention may also be applied to zoom lenses to which drive units are attached internally.

In addition, according to the above-described embodiments, the zoom lens includes the lens sub-unit 2b which corrects the displacement of the image plane during the variation of magnification. However, the present invention may also be applied to three-unit zoom lenses in which the lens unit II is free from the lens sub-unit 2b and the focus lens unit serves the function of the lens sub-unit 2b.

In addition, although the relationship between the refractive powers of the lens units or the lens elements is explained in the above-described embodiments, the above-described relationship is also applicable to that between optical powers equivalent to the refractive powers of the diffractive optical elements which are, for example, adhered to the lens surfaces.

According to the present invention, a part of the positive optical power to be provided by the second lens sub-unit, which moves for the focal point adjustment, is provided by the third lens sub-unit, which is fixed in the focal point adjustment. Accordingly, the weight of the second lens sub-unit is reduced while its sensitivity to back focus is ensured. Therefore, the driving force and the amount of movement of the second lens sub-unit for the focal point adjustment are reduced. As a result, a small zoom lens which provides excellent optical performance is obtained.

In addition, the third lens sub-unit which is fixed during the focal point adjustment may also be set eccentric in order to reduce the variations in aberrations caused by the focal point adjustment. Accordingly, a rear-focus zoom lens which has a simple structure and provides excellent optical performance is obtained.

As many apparently widely different embodiments of the present invention can be made without departing from the spirit and scope thereof, it is to be understood that the invention is not limited to the specific embodiments thereof except as defined in the claims.

This application claims priority from Japanese Patent Application No. 2004-109412 filed Apr. 1, 2004, which is hereby incorporated by reference herein.

What is claimed is:

1. A lens device having a function of varying a magnification of the lens device and a function of focusing, comprising, in the order from an object side to an image side:
   a first lens unit which has a positive optical power and which is fixed during the variation of magnification;
   a second lens unit which has a negative optical power and which moves during the variation of magnification; and
   a third lens unit which has a positive optical power and which is fixed during the variation of magnification,
   wherein the third lens unit includes a first lens sub-unit which is fixed during focusing, a second lens sub-unit which has a positive optical power and which moves during focusing, and a third lens sub-unit which has a positive optical power and which is fixed during focusing, in that order from the object side to the image side.

2. The lens device according to claim 1, wherein the optical power of the second lens sub-unit is higher than the optical power of the third lens sub-unit.

3. The lens device according to claim 2, wherein, when a focal length of the overall lens device at a wide-angle end is 1, the following expressions are satisfied:

$$0.1 < \phi_{3c}/\phi_{3b} < 0.8$$

$$0.09 < \phi_{3b} < 0.19$$

where $\phi_{3b}$ is the optical power of the second lens sub-unit and $\phi_{3c}$ is the optical power of the third lens sub-unit.

4. The lens device according to claim 2, wherein the following expression is satisfied:

$$0 < \alpha_{3b} < 0.35$$

where $\alpha_{3b}$ is a converted inclination angle of incidence of an on-axis light ray on the second lens sub-unit.

5. The lens device according to claim 1, further comprising an adjustment mechanism for adjusting a state of eccentricity of the third lens sub-unit with respect to an optical axis of the overall lens device.

6. The lens device according to claim 1, wherein, when the second lens sub-unit is positioned such that an object at infinity is in focus and a focal length of the overall lens device at a wide-angle end is 1, the following expression is satisfied:

$$|\alpha_{p3b} \cdot \phi_{3b} \cdot (sk \cdot \phi_{3c} - 1) \cdot x \cdot (x+\delta)/b^2| < 2.0 \times 10^{-4}$$

where $\alpha_{p3b}$ is a converted inclination angle of incidence of an off-axis principal light ray on the second lens sub-unit, $\phi_{3b}$ is the optical power of the second lens sub-unit, $\phi_{3c}$ is the optical power of the third lens sub-unit, sk is a distance from a principal point of the third lens sub-unit to the image plane, x is an amount of movement of the second lens sub-unit between a position where the second lens sub-unit focuses on the object at infinity and a position where the second lens sub-unit focuses on an object at the closest distance at a telephoto end, $\delta$ is a difference between a distance from the principal point of the second lens sub-unit to a virtual image of a diaphragm and a distance from the principal point of the second lens sub-unit to a virtual image of an imaging position, and b is the magnification of the lens device.

7. The lens device according to claim 1, wherein the second lens unit includes a fourth lens sub-unit which has a negative optical power and which moves for varying the magnification and a fifth lens sub-unit which has a negative optical power and which moves for correcting a displacement of an image plane caused when the fourth lens sub-unit moves, in that order from the object side to the image side.

8. A shooting system comprising:
   the lens device according to claim 1; and
   a shooting apparatus to which the lens device can be attached.

* * * * *